United States Patent [19]

Skybyk

[11] Patent Number: 5,334,899
[45] Date of Patent: Aug. 2, 1994

[54] POLYPHASE BRUSHLESS DC AND AC SYNCHRONOUS MACHINES

[76] Inventor: Dymytro Skybyk, 340 Evans St., Williamsville, N.Y. 14221

[21] Appl. No.: 36,862

[22] Filed: Mar. 25, 1993

Related U.S. Application Data

[63] Continuation-in-part of Ser. No. 968,870, Oct. 30, 1992, which is a continuation-in-part of Ser. No. 769,355, Sep. 30, 1991, Pat. No. 5,216,339.

[51] Int. Cl.$^5$ .............................................. H02K 1/22
[52] U.S. Cl. .................................. 310/268; 310/164; 310/114
[58] Field of Search .................. 310/114, 112, 52, 121, 310/126, 127, 268, 68A-68C, 64, 266, 164

[56] References Cited

U.S. PATENT DOCUMENTS

| | | |
|---|---|---|
| 2,719,931 | 10/1955 | Kober . |
| 2,873,395 | 2/1959 | Kober . |
| 3,394,276 | 7/1968 | Cafici . |
| 3,524,250 | 8/1970 | Burr ........................... 310/268 |
| 3,906,267 | 9/1975 | Coupin et al. . |
| 3,922,574 | 11/1975 | Whiteley . |
| 3,979,619 | 9/1976 | Whiteley . |
| 3,999,092 | 12/1976 | Whiteley . |
| 4,006,375 | 2/1977 | Lyman, Jr. et al. . |
| 4,020,372 | 4/1977 | Whiteley ..................... 310/268 X |
| 4,043,614 | 8/1977 | Lyman . |
| 4,187,441 | 2/1980 | Oney . |
| 4,188,556 | 2/1980 | Hahn . |
| 4,234,838 | 11/1980 | Langley et al. . |
| 4,237,396 | 12/1980 | Blenkinsop et al. ......... 310/268 X |
| 4,484,097 | 11/1984 | Kanayama et al. . |
| 4,536,672 | 8/1985 | Kanayama et al. . |
| 4,563,606 | 1/1986 | Fukasawa et al. ............ 310/164 X |
| 4,568,862 | 2/1986 | Tassinario . |
| 4,629,920 | 12/1986 | Hermann . |
| 4,633,149 | 12/1986 | Welterlin . |
| 4,803,387 | 2/1989 | Seider . |
| 4,814,651 | 3/1989 | Elris et al. . |
| 4,882,524 | 11/1989 | Lee . |
| 4,996,457 | 2/1991 | Hawsey et al. ............... 310/268 |
| 5,099,182 | 3/1992 | Isaacson et al. . |

Primary Examiner—Steven L. Stephan
Assistant Examiner—Ed To
Attorney, Agent, or Firm—Richard C. Litman

[57] ABSTRACT

This invention relates to high-density discoidal brushless induction open frame motors and generators with multistacking, multiphasing and multistaging capability. These motors may be in the range from 10 hp to 25,000 hp or more and these generators may range from 10 kVA to 10 megawatts or more. Rare earth permanent magnets or wound DC field poles are arranged about a disk shaped rotor. A rectangular toroidal lamination core within the stator element serves as the mounting for numerous flat wound armature coils. The heat generated by the high flux and current densities is dissipated by a liquid cooling arrangement built into the toroidal stator element. The absence of the need to use the frame as a flux return path allows light weight aluminum to be used without a loss in efficiency. The open frame structure allows for easy cascading of multiple units along the same shaft for higher capacity.

25 Claims, 18 Drawing Sheets

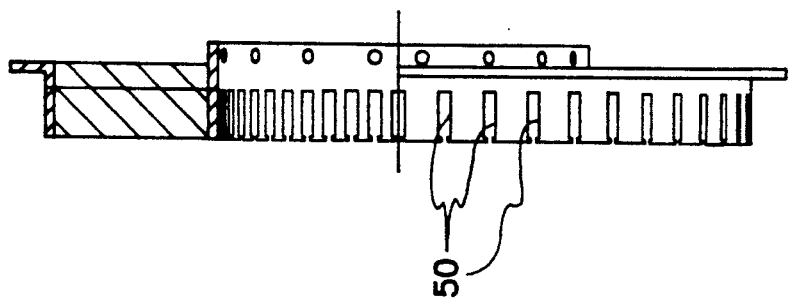
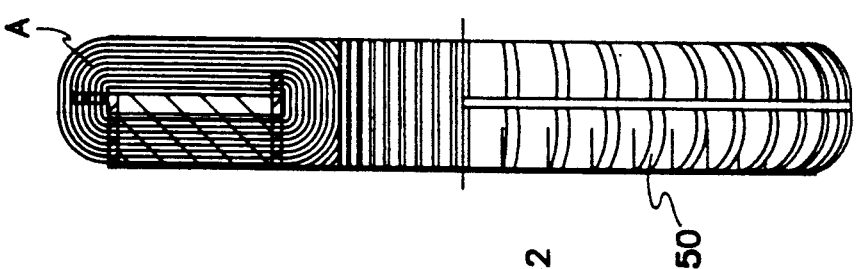
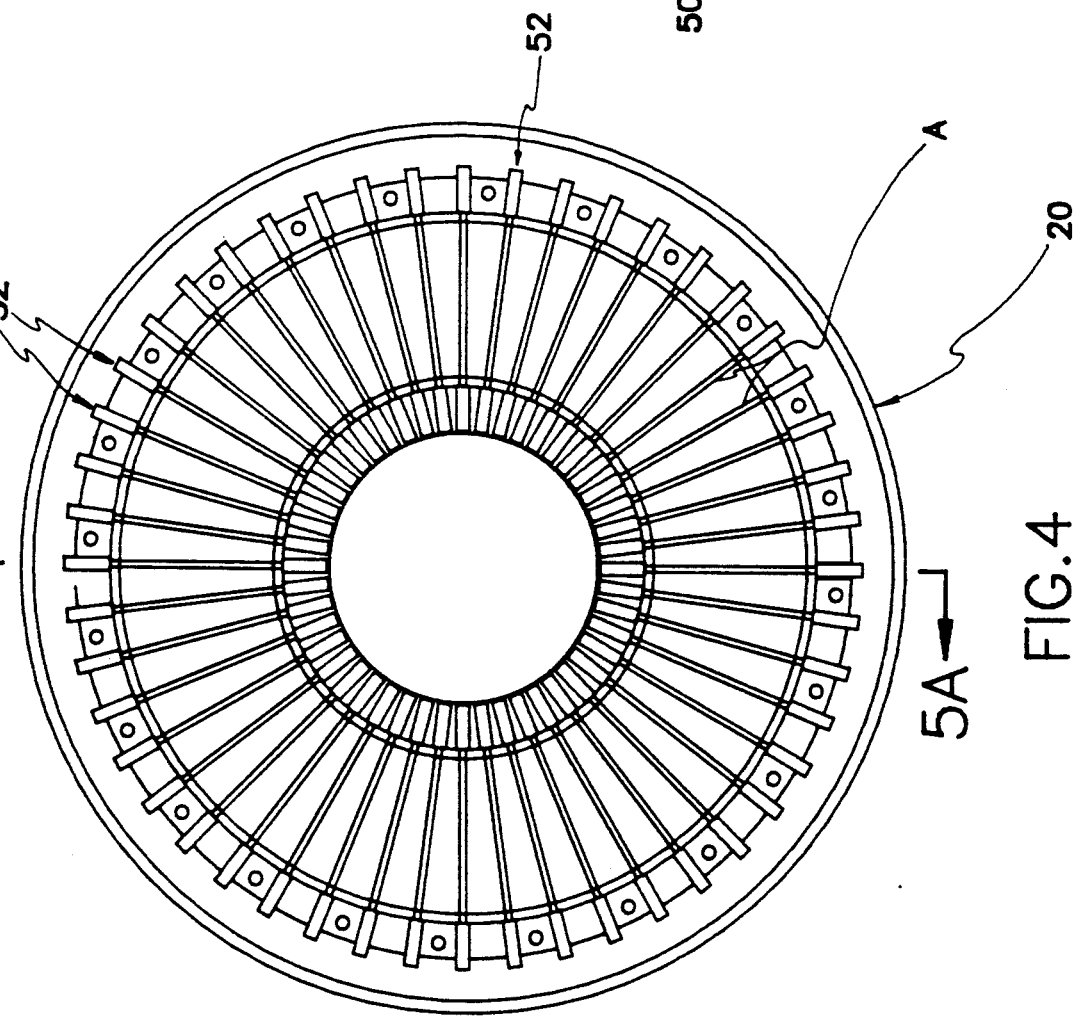

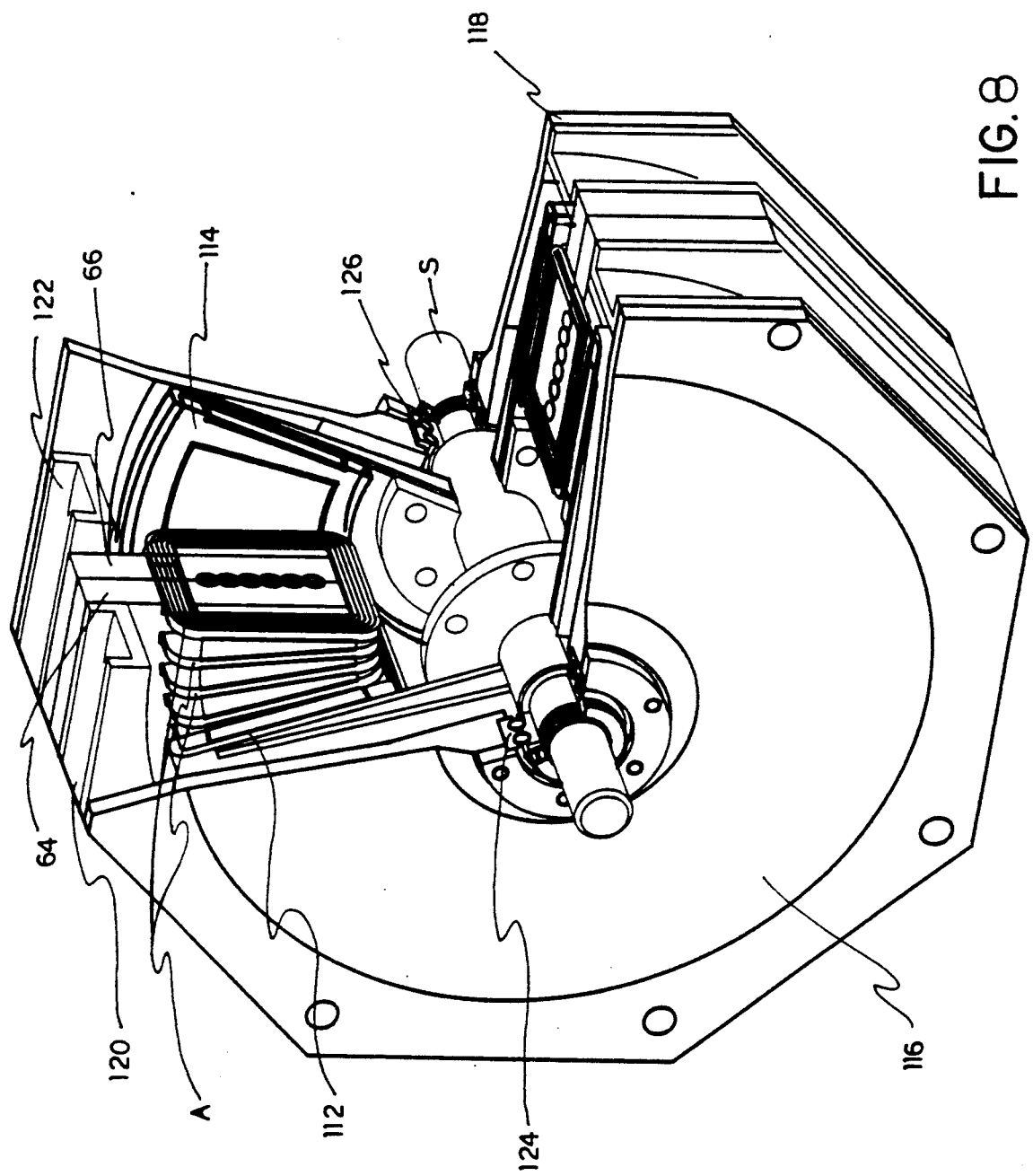

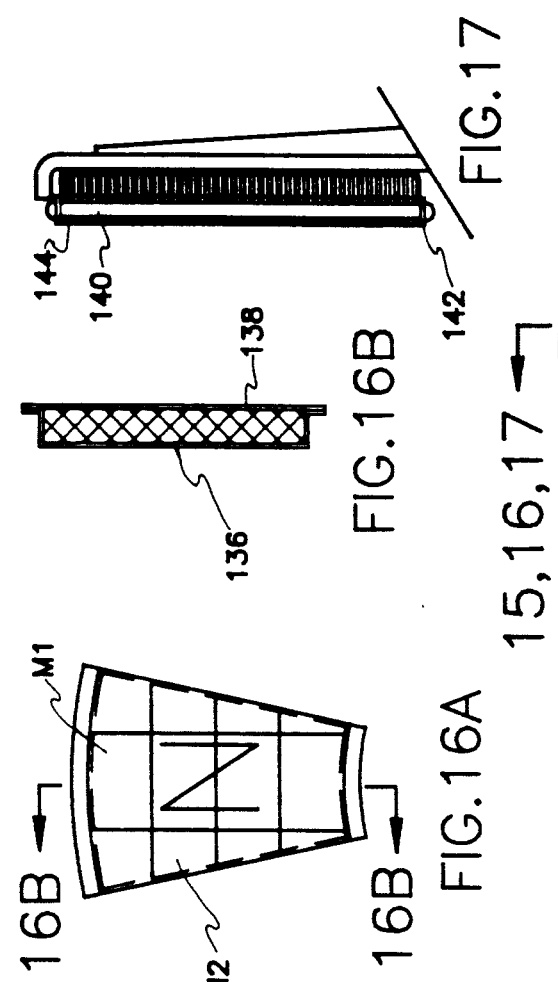
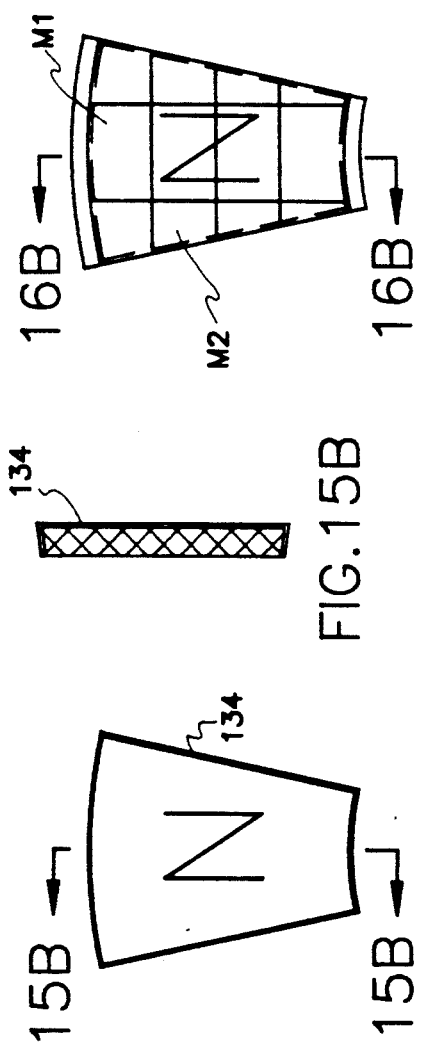
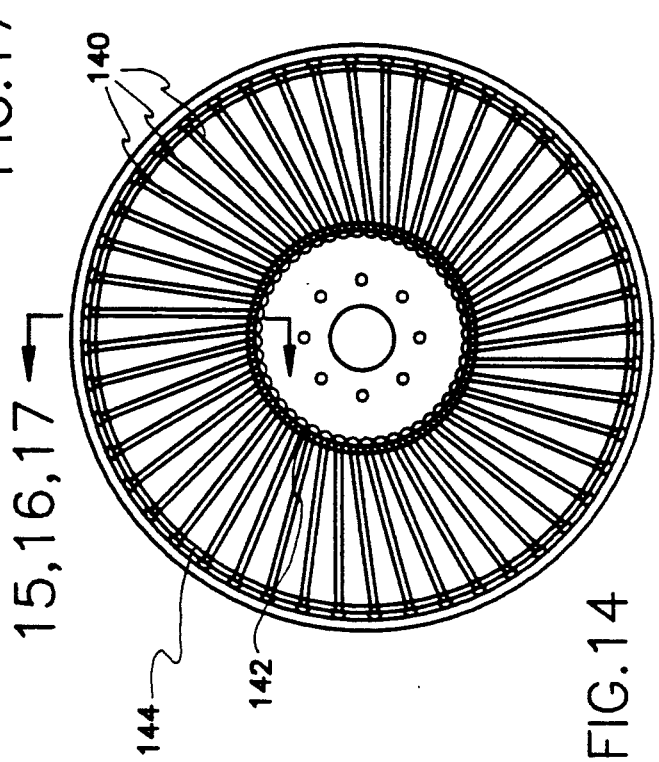
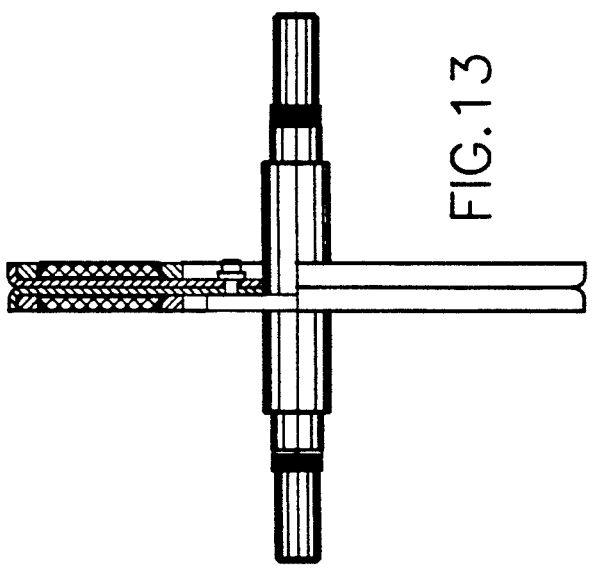

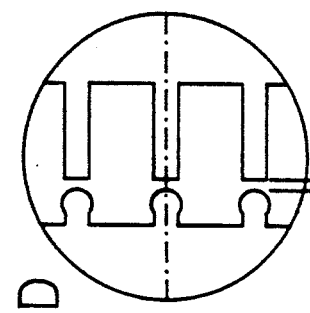
FIG.21D
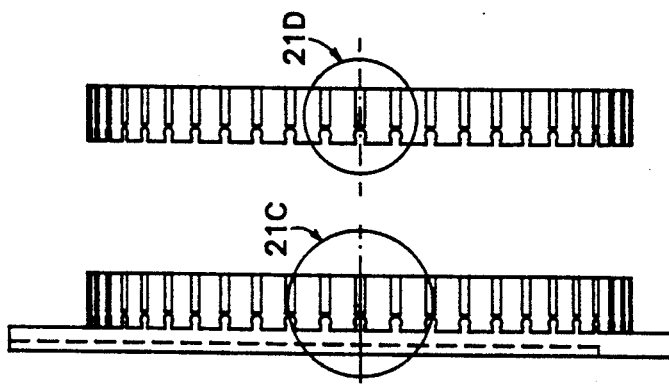
FIG.21A
FIG.21B
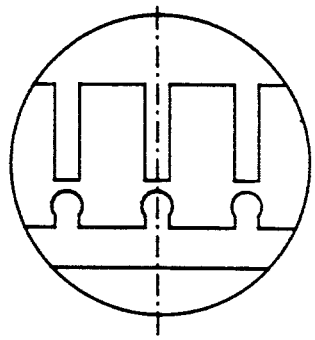
FIG.21C
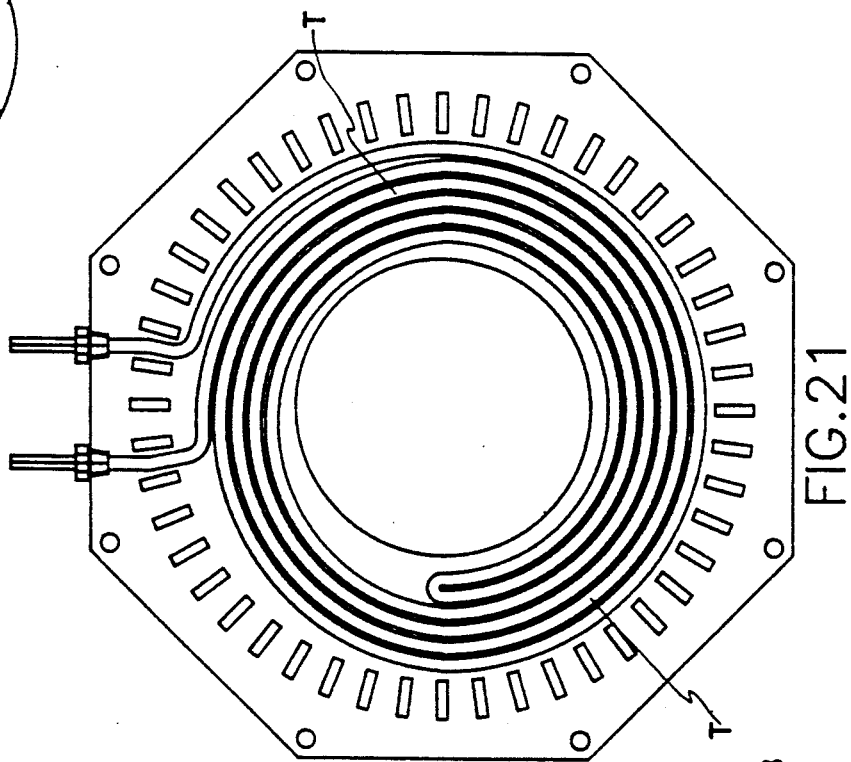
FIG.21
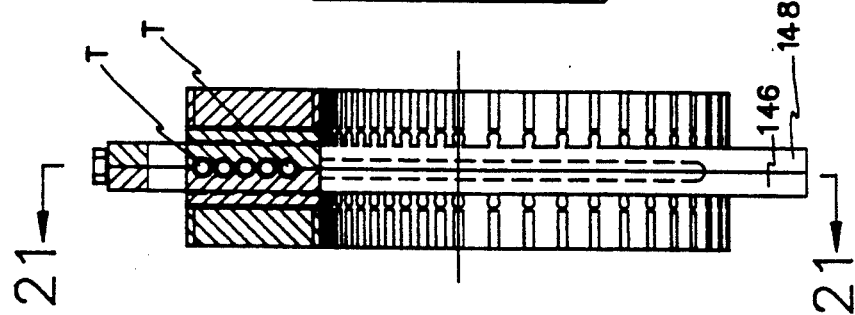
FIG.20

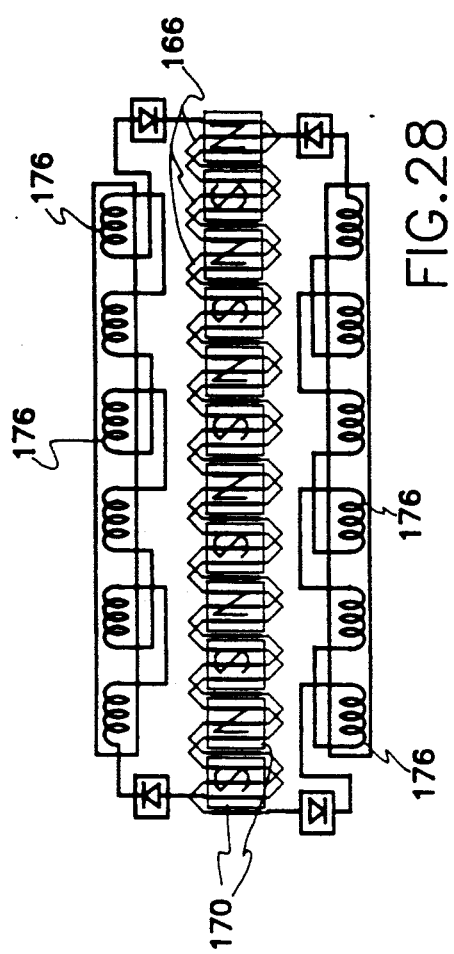
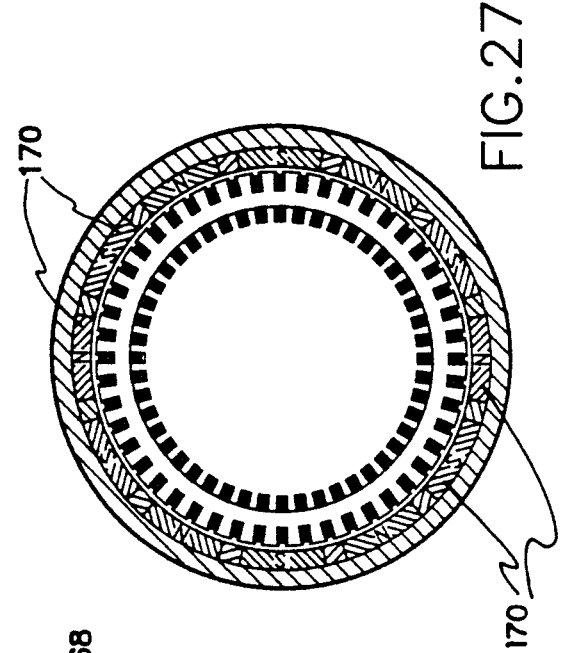
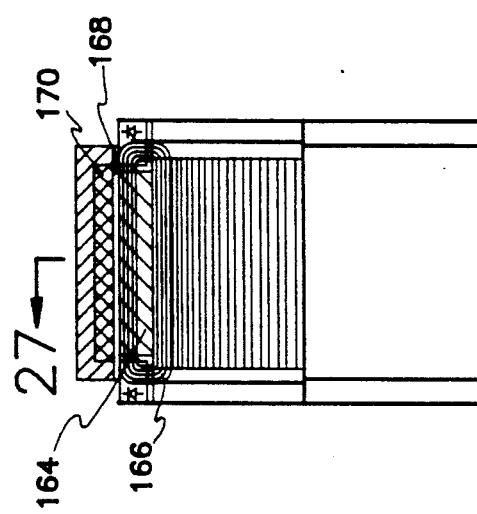
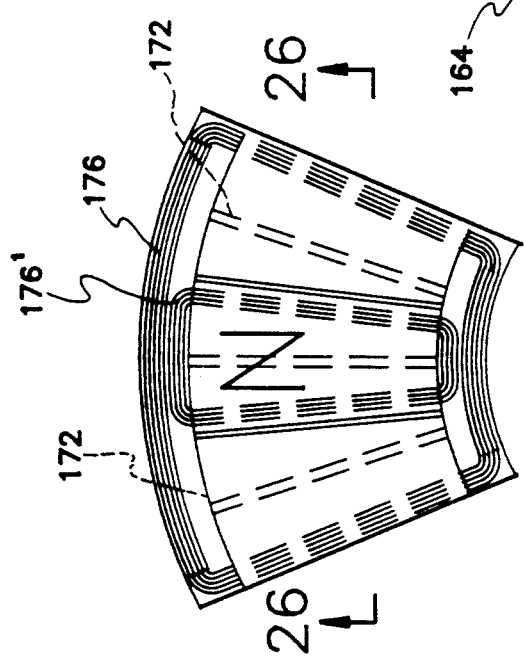
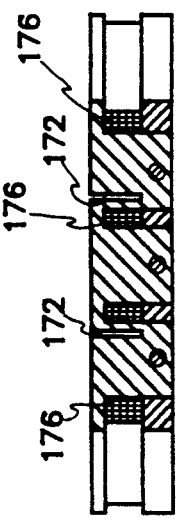

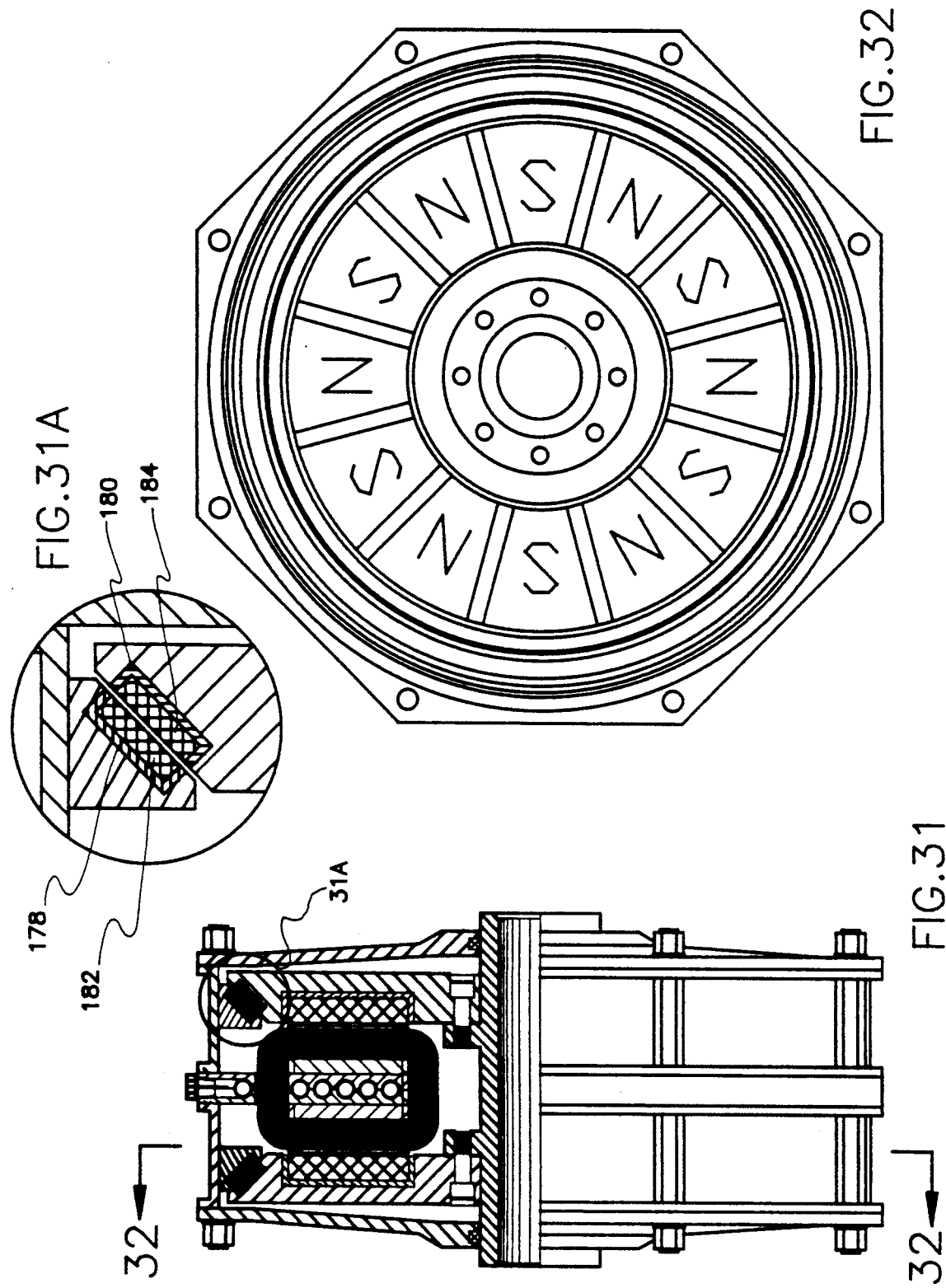

POLYPHASE BRUSHLESS DC AND AC SYNCHRONOUS MACHINES

CROSS REFERENCE OF TO RELATED APPLICATIONS

This application is a continuation-in-part of Ser. No. 07/968,870, filed Oct. 30, 1992, which is a continuation-in-part of Ser. No. 07/769,355, filed Sep. 30, 1991.

BACKGROUND OF THE INVENTION

1. Field of the Invention

The present invention relates to discoidal electric motors and generators. More specifically, the present invention relates to electric motors and generators having an inverted stator/rotor configuration wherein the lamination core or cores and the coils wrapped thereabout are fixed, with the wires extending from the coils extending axially from the frame, and the rotors carry either permanent magnets or an array of self-exciting DC field poles having alternating polarities. Even more specifically, the present invention relates to electric motors or generators having the above-mentioned stator/rotor configuration and having an integral heat sink, either air or liquid cooled, mounted proximate to the fixed coils and lamination cores.

2. Description of the Prior Art

Conventional DC motors or generators where the armature coils are wound on the rotor and the permanent magnets or field poles are mounted on the stator require brush type commutators. These brush type motors are gradually being replaced with more advanced brushless DC motors, AC synchronous motors, or induction motors with variable frequency controls. There are however, disadvantages to the machines commonly in use. Wound field pole DC motors are relatively heavy and large per measured unit of power output and require constant maintenance of the commutator. The larger machines need more iron to dissipate the large amount of heat generated by the heavy current flow through the copper conductors and for the magnetic flux circulation within the machine. The efficiency of the larger machines is directly related to machine design and characteristics of power losses, iron core losses, copper losses, windage and stray losses, and heat ($I^2R$) losses. There are additional losses though the DO and AC inverters and frequency controllers, which, additionally, have high maintenance and operating costs.

SUMMARY OF THE INVENTION

The present invention has been developed to increase the overall energy efficiency of motors and generators by reducing the size and weight of these devices per unit of energy produced. Two preferred embodiments of the invention have been developed. The first machine consists of two independent stator assemblies, with separate lamination cores and armature windings to interact with the rotors. The second consists of a single lamination core with the slots containing the armature windings arranged such that two sets of rotors, operating on opposite sides of the lamination core can interact with the coils. The lamination cores are proximately mounted to an integral heat sink, which is either air or liquid cooled. Both embodiments are essentially identical in operation. However, each has specific characteristics that favor different applications. Each machine can function as a motor or a generator, but the embodiment having two independent cores and windings would operate as a more efficient generator, having more copper for the induced current flow, while the embodiment having the single lamination core with the windings extending therethrough would operate as a more efficient motor, having a greater amount of iron for providing a greater magnetic flux density, thus creating more torque. When the device is used as a motor, adjacent armature coils are connected in groups of a predetermined number, N, of adjacent coils to form a number of "phases". These "phases" are then series connected to a commercially available "chopper" circuit or the like to provide for a magnetic flux of alternating polarity in each of the "phases" set around the lamination core. Two different ways of generating a constant magnetic field about the stators can be used, depending on design parameters, particularly the size, of the machine. The first are rare earth permanent magnets set in flanges or in a steel U-shaped channel within the body of the rotor and the second type are pre-wound self exciting DC field poles likewise situated.

Accordingly, it is a principal object of the invention to provide a discoidal motor/generator having either a single or dual lamination core stator depending on the desired use of the machine.

It is another object of the invention to provide a discoidal motor/generator having an aluminum air or water cooled heat sink integral with and proximate to the lamination cores.

It is a further object of the invention to provide a discoidal motor/generator where both ends of the stationary armature coil conductors are extended to the outside of the stator assembly and are connected to a predetermined number, N of adjacent coils, and where each string of N coils are connected in series by switching and control means and each string represents one phase.

Still another object of the invention is to provide a discoidal motor assembly where each string of N connected armature coils is connected in parallel between the terminals of the power supply such that the power supply in amperes $P_a$ is divided by N number of strings, allowing for less expensive components to be utilized in the manufacturing process.

It is yet another object of the invention to provide a discoidal motor assembly described in the preceding paragraph wherein the output torque of the motor can be controlled by selectively switching the separate strings of N coils on or off.

It is still yet another object of the invention to provide for a discoidal motor/generator wherein the rotors contain permanent magnets that are of alternating polarity and further are set within a highly permeable U-shaped steel channel.

Yet another object of the invention is to provide a discoidal motor/generator wherein the rotors can contain pre-wound field pole windings that are excited by a separate set of armature coils integral to the rotors wherein the current is induced in the second set of windings by an annular arrangement of permanent magnets integral with the stator.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a cross sectional view along line 4—4 of FIG. 2 showing a plan view of the stator assembly.

FIG. 5A is a side view with a partial cutaway along line 5A—5A of FIG. 4 showing the lamination core and winding of the armature coils.

FIG. 5B is similar to FIG. 5A but shows the laminated core assembly with pre-machined rectangular slots for the armature coils.

FIG. 8 is an isometric view with a partial cutaway of a fourth embodiment of the invention having a dual lamination core mounted on either side of an integral heat sink and with a single set of armature windings extending through both of them. There are two sets of rotors, one lying on either side of the heat sink, between it and each of the endplates.

FIG. 13 is a partial cross sectional view of a dual rotor disk assembly mounted on a single shaft.

FIG. 14 is another view a long line 11,14—11,14 showing a radial cage rotor assembly to be used with a polyphase AC induction machine.

FIGS. 15a and 15b are a side view taken along line 15,16,17—15,16,17 of FIG. 14 showing an enlarged view of single piece rare earth or high grade ceramic permanent magnetic field pole with a cross sectional view included to show the pieces mounted in a steel shell having a high permeability to magnetic flux.

FIG. 15B is a cross sectional view taken along lines 15B—15B FIG. 15A.

FIGS. 16a and 16b are a side view taken along line 15,16,17—15,16,17 of FIG. 14 showing field poles similar to those shown in FIGS. 15A and 15B but where the poles are assembled from smaller pieces and placed within a stainless steel shell with a low carbon steel backup plate.

FIG. 16B is a cross sectional view taken along lines 16B—16B 16A.

FIG. 17 is a side view taken along line 15,16,17—15,16,17 of FIG. 14 showing the radial cage rotor.

FIG. 20 is a view similar to that of FIG. 19A, but with the armature windings removed and showing the pre-machined rectangular slots designed to receive the windings.

FIG. 21 is a view taken along line 21—21 of FIG. 19A showing the internal spiral copper tubing that fits into the pre-cast aluminum heat sink.

FIG. 21A is a view of one half of the pre-cast aluminum core assembly.

FIG. 21B is a view similar to that of FIG. 21A but with the heat sink plate removed.

FIG. 21C is an enlarged view of the circled area in FIG. 21A.

FIG. 21D is an enlarged view of the circled area in FIG. 21B.

FIG. 25 is an enlarged view within the arrow circle 25 of FIG. 24 showing the dual field pole winding of the DC field pole assembly.

FIG. 26 is a cross sectional view along line 26—26 of FIG. 25 showing more detail of the field pole assembly.

FIG. 26A is an expanded partial cross section of the second lamination core and armature windings integral with the rotor assembly and proximate the shaft, and also shows the permanent magnets mounted on the inner portion of the stator to induce current in the secondary windings to thereby excite the wound field poles on the rotor.

FIG. 27 is a expanded cross sectional view along line 27—27 of FIG. 26A showing the dual annulus formed by the permanent magnets of alternating polarity and the secondary lamination core and armature windings.

FIG. 28 is a schematic showing the operation of the 5 permanent magnets on the stator interacting with the secondary armature windings as the latter pass by the former, much in the fashion of a standard alternator.

FIG. 31 is a sixth embodiment of the present invention wherein permanent magnets are mounted within a U-shaped channel of high magnetic flux permeability and the rest of the body of the rotor is made of an aluminum, plastic, or composite material for low inertia/high RPM applications. Also shown are permanent frictionless magnetic bearings where opposite polarities face each other, both extending completely about the peripheral beveled edge of the rotor and the opposing bevel in the frame of the motor/generator to maintain the minimal axial air gap between the rotor(s) and armature coils.

FIG. 31A is an enlarged scale view within the circle 31A of FIG. 31.

FIG. 32 is a view along line 32—32 of FIG. 31 showing a plan view of the rotor disk assembly.

Similar reference characters denote corresponding features consistently throughout the attached drawings.

DETAILED DESCRIPTION OF THE PREFERRED EMBODIMENTS

The present invention relates to motors and generators built using a discoidal open frame structure, with the structure being modular, allowing the motor/generator to be extended axially into a multistage configuration.

Figure 1:
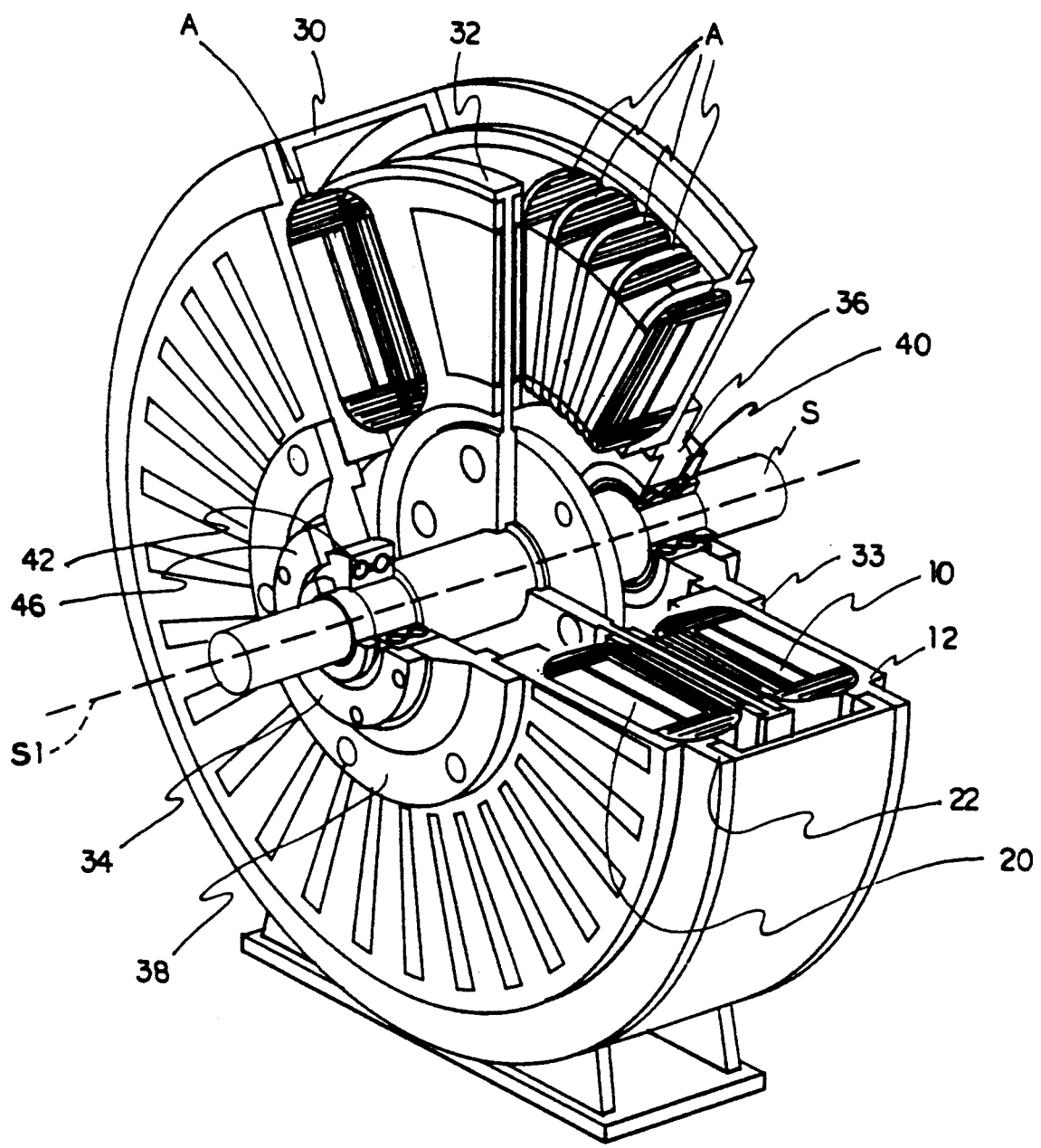
FIG. 1 is an isometric partial cutaway view showing the internal components of a first embodiment of the invention having two separate lamination cores with a dual disk rotor placed therebetween.
Figure 3:
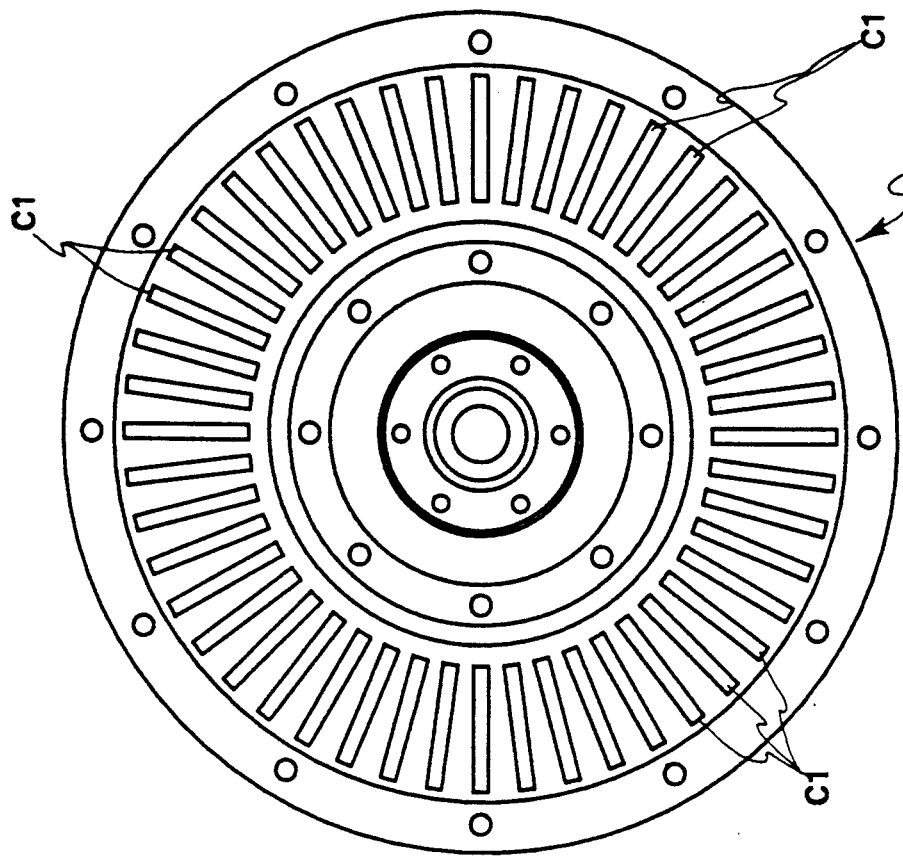
FIG. 3 is a side view along line 3—3 of FIG. 2 of the aluminum end plate assembly showing the rectangular slots for air cooling.
Figure 2:
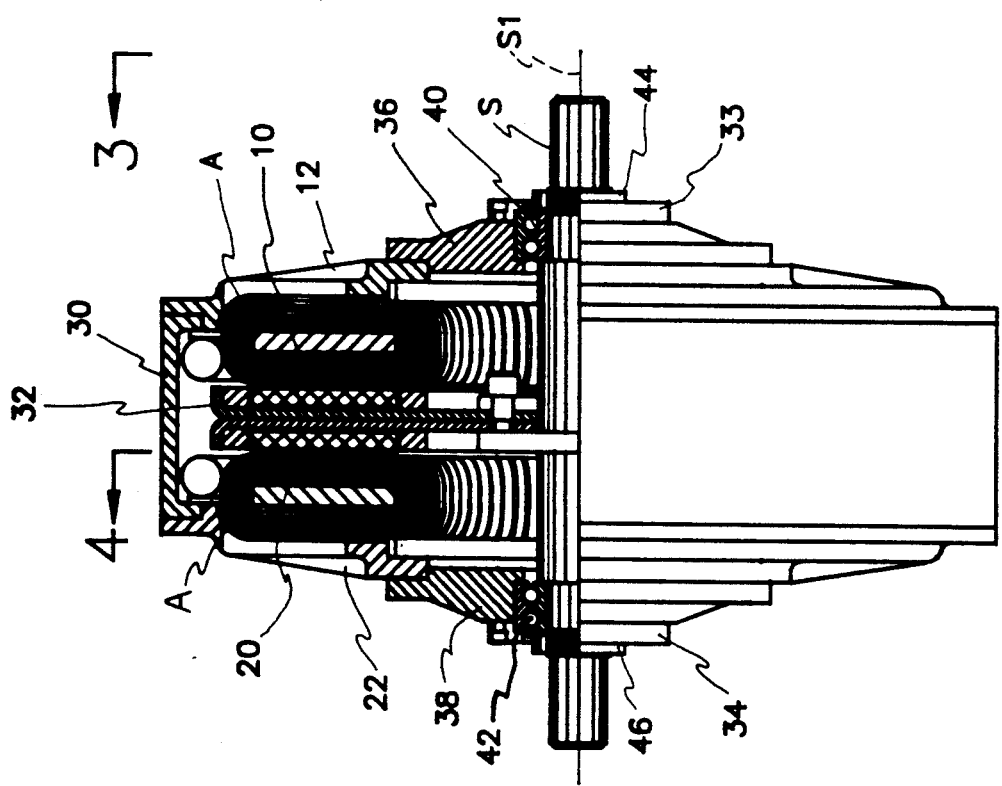
FIG. 2 is a partial cross section view along the shaft axis the first embodiment.

In FIGS. 1 and 2 a first preferred embodiment of the invention is shown having two separate lamination cores 10, 20. These lamination cores are in the form of generally rectangular tori located about, and perpendicular to, the shaft S, which defines an axis S1, shown in broken lines in FIGS. 1 and 2. Armature coils A are wound across and through the lamination cores 10, 20 so as to extend radially away from the shaft axis S1. In this embodiment of the invention, there are two air cooled housing end plates 12 and 22 integral with and proximate to the lamination cores 10, 20. The end plates 12, 22 are preferably made of pre-cast aluminum or some other substance having a high degree of thermal conductivity. The shape of the end plates can be round, hexagonal, octagonal, or any other shape consistent with the design parameters of the machine. There is a spacer channel 30, and a dual rotor disk assembly 32 located in between the two lamination cores 10, 20. There are two bearing plates 33, 34, two bearing flange plates 36, 38, ball bearing housings 40, 42, and bearing lock nuts 44, 46. The lock nuts 44, 46 hold the bearing plates 32, 34 and the bearing flange plates 36, 38 in place, and thus snugly fit the ball bearing housings 40, 42 against the shaft shoulders. The dual rotor disk assembly 32 is bolted to a shaft flange and has, in this embodiment, permanent magnet field poles (discussed in greater detail below) mounted to face the lamination cores 10, 20 and armature coils A, with a minimal axial air gap between the coils on the stator and the magnets mounted on the dual rotor disk assembly 32. This air gap would be determined by the shaft shoulder length and the spacer channel 30. If desired, shims could be added between the spacer channel 30 and the endplates 12, 22, In this embodiment, the lamination cores 10, 20 and the armature coils A are mounted proximate to the endplates 12, 22, which are made of aluminum and have radially distributed air cooling slots C1 in the outer surface, as seen in FIG. 3. In FIG. 4, being a view taken along line 4—4 of FIG. 1, we see the armature coils A mounted radially at equal intervals on the laminated core assembly 20. These coils A are wound through the core(s) 20, 10 and are placed in the slots 50, shown in FIGS. 5A and 5B. Pre-formed electrical insulation (not shown) is inserted into the slots 50 before the coils A are mounted therein. The coils A are formed of rectangular copper wire and both ends of the coils A extend outward away from the shaft axis S1 proximately towards the areas indicated at 52 in FIG. 4. The number of turns per coil, the size and depth of the slots, and the type and/or kind of electrical insulation used would be predetermined by the design parameters of the machine. The number of ampere turns per coil are limited by the size and depth of the slots and not by the number of turns or frame structure.

The laminated cores 10, 20 are assembled of a continuous thin strip of 0.014 inch thick (M-14) 5% silicon steel to reduce hysteresis and eddy current losses. The cores are tightly wound on a ⅛ to ¼ inch thick cylinder of steel having high permeability to magnetic flux and the strip is wrapped about it to a thickness of 2 to 12 inches depending on the size of the machine. A low carbon steel angle ring 54 is press fitted on the outside of the laminated core(s) 10, 20 to keep the core together. Additionally, in the bottom portion of the core(s) 10, 20, as seen in FIG. 5B, there are holes 56, from ⅛ to ¼ of an inch in diameter that are drilled out to allow low carbon steel rods (not shown) to be press fitted therein, thus increasing the shear strength of the entire core assembly.

Figure 7:
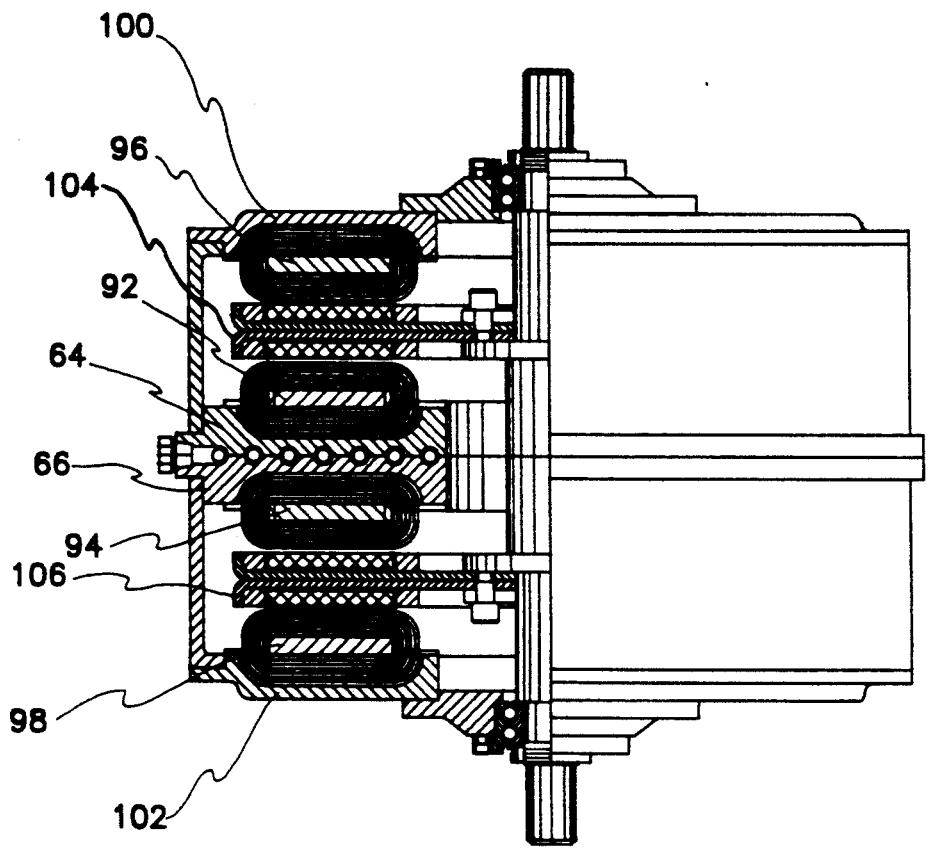
FIG. 7 is a partial cross section view of a third embodiment of the invention having four separate lamination cores and their attendant windings, two of which are mounted on an integral heat sink and the other two being mounted on an aluminum outer end plate to dissipate their generated heat into the air, with two dual rotors mounted between each of the pairs of armature coils.
Figure 6:
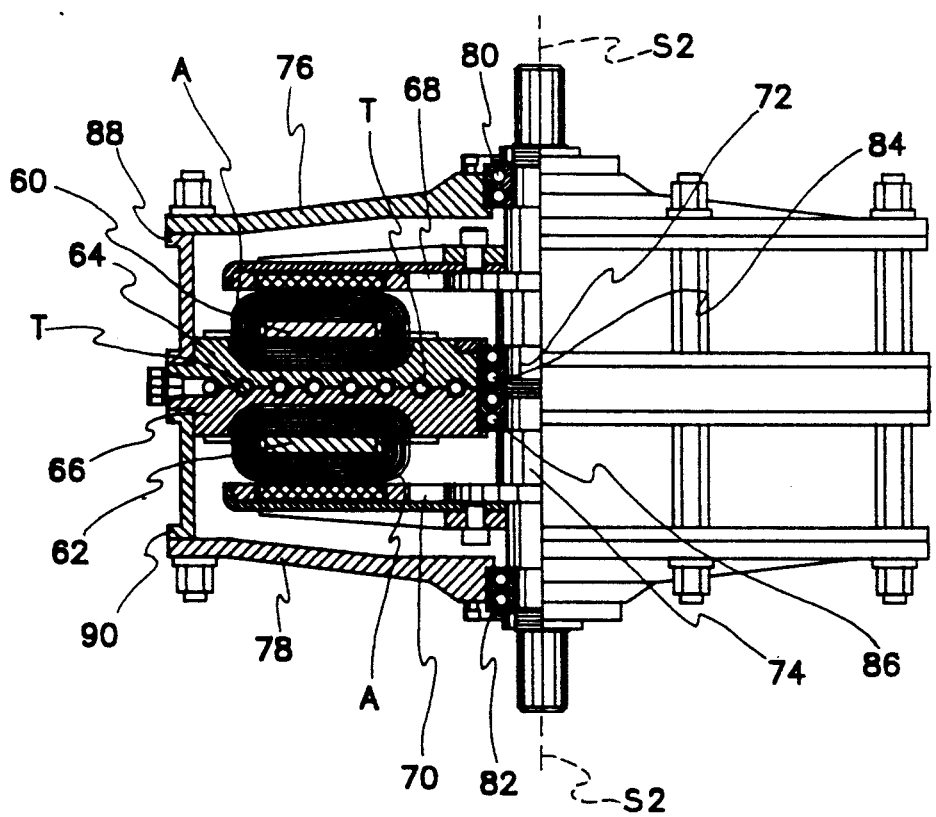
FIG. 6 is a partial cross section view of a second embodiment of the invention showing two separate lamination cores mounted on either side of an integral heat sink, with two rotors mounted on independent shafts proximate each lamination core and its attendant windings, each rotor being able to operate as an independent motor.
Figure 10:
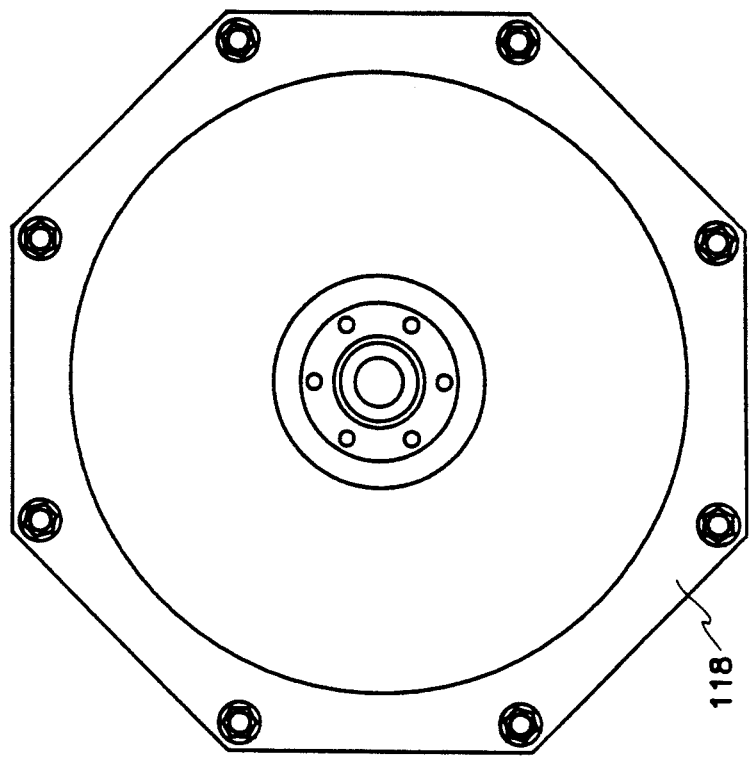
FIG. 10 is a side view along line 10—10 of FIG. 9 showing the octagonal shape of the end plate assembly.

Turning to FIGS. 6 and 7, there are shown the second and third embodiments of the present invention. In FIG. 6, there are two separate rectangular, toroidal lamination cores 60 and 62, each formed from materials generally discussed above, each located about and perpendicular to the shaft axis S2, and each integral with one of two precast halves 64, 66 of a heat sink. The halves 64, 66 are preferably made of aluminum or a similar substance having a high thermal conductivity, and have contained therebetween a length of spiral copper tubing T for fluid coolant circulation. There are two sets of armature coils A disposed radially from the shaft axis S2 passing through the cores 60, 62. Each of the two single rotor assemblies 68, 70 are connected, in this embodiment, to one of the two shafts 72, 74 that both share the common axis S2. This embodiment also has two aluminum end plates 76, 78, two outer bearing assemblies 80, 82, two inner bearing assemblies 84, 86, the inner bearings being proximate to the two halves 64, 66 of the heat sink and each supporting one of the shafts 72, 74. The axial air gap between the stators and the rotors is maintained by the shaft shoulders, the inner ball bearing assemblies 84, 86, and the outer spacer channels 88, 90. In this embodiment, each set of one rotor and one stator can operate as an independent motor within on housing. They could rotate in the same, or in opposite directions depending on the electric switching and control means, which will be discussed further below.

In FIG. 7 there is shown an embodiment of the invention wherein there are four separate lamination cores 92, 94, 96, 98. Cores 92 and 94 are interiorly mounted on two halves 64, 66 of a heat sink similar to the one discussed above in the previous embodiment. Cores 96 and 98 are mounted proximate to aluminum air cooled heat sinks 100, 102, which are similar to the air cooled housing end plates of the first embodiment of the invention, having air cooling slots C1 on their outer surfaces as shown in FIG. 3. This embodiment has a pair of dual rotor disk assemblies 104, 106, similar to those discussed in the first embodiment of the invention wherein permanent magnet field poles are mounted to face the lamination cores 92, 94, 96, 98 and armature coils A, with a minimal axial air gap between the coils on the stators and the magnets mounted on the dual rotor disk assemblies. In the embodiment shown in FIG. 7, all four of the lamination core-armature winding stages are connected in parallel through solid state power switches to a main power supply, and the output torque is multiplied by the number of stages in the machine. It should be noted that in a multistage configuration as herein described, each set of stages could be switched on or off whenever higher or lower torque is desired.

Figures 11, 12:
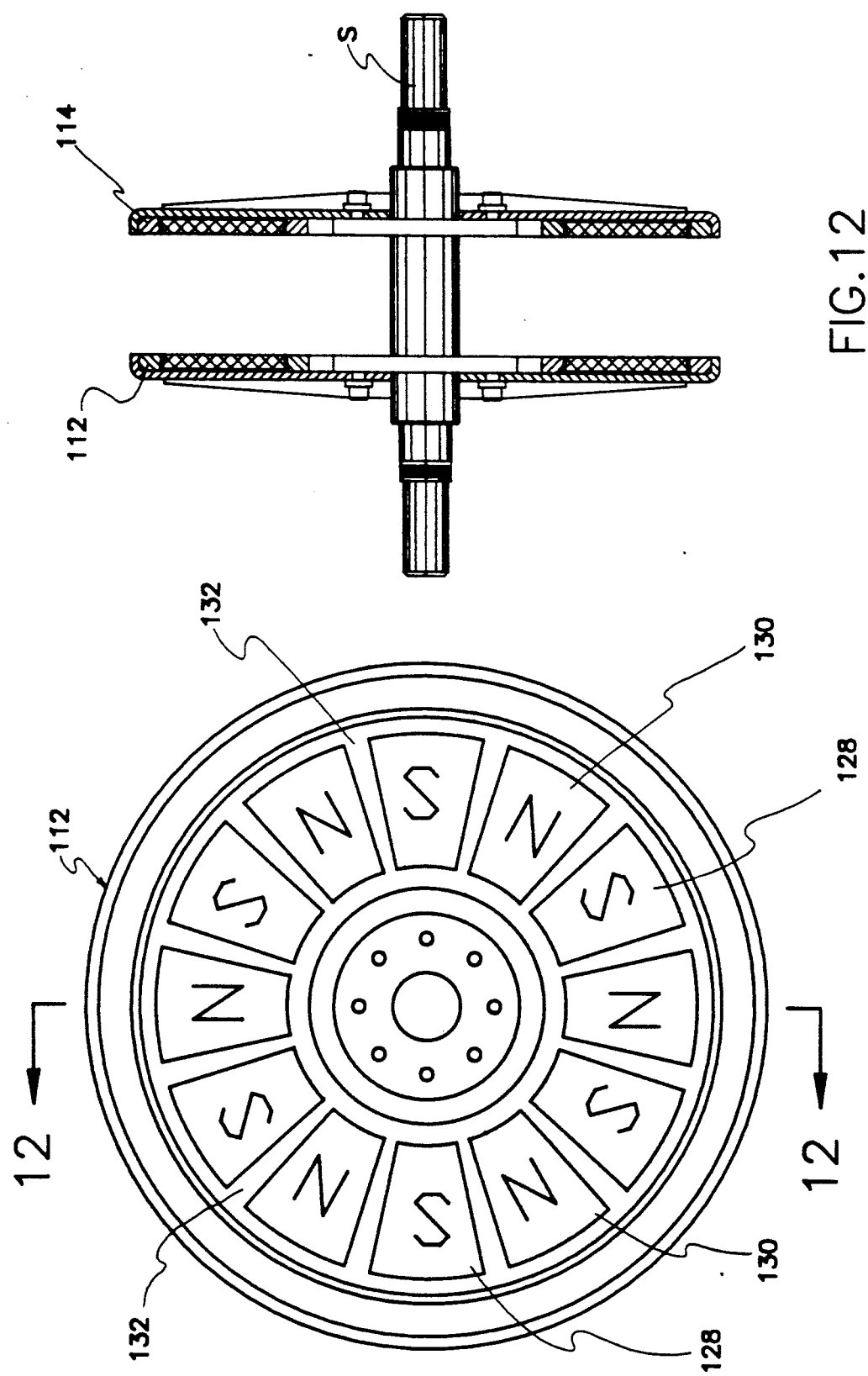
FIG. 11 is a cross sectional view along line 11,14—11,14 of FIG. 9 showing a plan view of one of the rotor disks showing rare earth permanent magnet field poles.
FIG. 12 is a cross sectional view along line 12—12 of FIG. 11 showing two single rotor disks mounted on a single shaft.

FIGS. 8-13 shows a fourth embodiment of the invention. In this embodiment, a pair of separate lamination cores 108, 110 are located on either side of the two halves 64, 66 of a heat sink similar to those discussed previously. In this embodiment, the armature coils A are wound across and through both the lamination cores and extend radially at regular intervals away from the shaft S, as in the other embodiments. There are two rotors 112, 114 on either side of the heat sink/dual lamination core assembly, two aluminum endplates 116, 118, two outer spacer channels 120, 122, and two bearing assemblies 124, 126. In FIG. 11 there is shown the rotor assembly 112 having rare earth permanent magnet field poles of alternating polarity 128, 130 disposed radially and separated by an aluminum or epoxy cast cage plate 132. In FIG. 12 there is shown the two rotors 112, 114 mounted on the output shaft S.

We turn now to a discussion of the various types of rotors that can be utilized in the present invention. Referring to FIGS. 11, 12, and 13, the body of the rotors can be made of a metal having a high permeability to magnetic flux, such as a low carbon steel. The thickness of the rotor body could range from 3/16 of an inch for smaller machines up to ¼ of an inch for the larger diameter rotors. In FIG. 15A, 15B there is shown an enlarged view of a generally pie-shaped single piece magnetic pole made of a rare earth or a high grade ceramic permanent magnet having a steel shell 134, this shell being anywhere from 1/16 to ¼ of an inch thick. The steel shell 134 reinforces the magnet and thus prevents the brittle ceramic from breaking during handling and assembly. In larger machines, the high cost of rare earth permanent magnets could be reduced by pre-assembling smaller pieces of the magnets M1, M2 within a non-magnetic stainless steel shell 136, backed up by a low carbon steel plate 138 and then riveting them together, as shown in FIG. 15A, 15B. The pre-assembled pole pieces are magnetized across their flat axis in batches of opposing polarity, and are then assembled within a flange in the rotor disk, separated by an aluminum or pre-cast epoxy cage plate, as shown in FIG. 11 at 132.

The dual rotor disk assembly shown in FIG. 13 is produced from two single rotor disks of the types discussed above, without reinforcing gussets, bolted or riveted together with an offset of one pole pitch. In other words, the North pole of the permanent magnet on one side of the dual rotor assembly is aligned with a South pole on the opposite side.

In FIG. 14 a radial cage type rotor disk is shown that would be used in a polyphase induction type machine. The pre-cast aluminum cross-rod connectors 140 are attached to inner and outer aluminum end rings, 142 and 144 respectively, as shown in FIGS. 14 and 17.

All of these types of rotors would be balanced to a minimal rotation speed of at least 5000 RPM or higher. In these machines, the magnets are positioned perpendicularly to the axis of rotation to reduce the stress at the edges of the pole pieces under the large amounts of centrifugal force generated at high RPM's.

Figure 9:
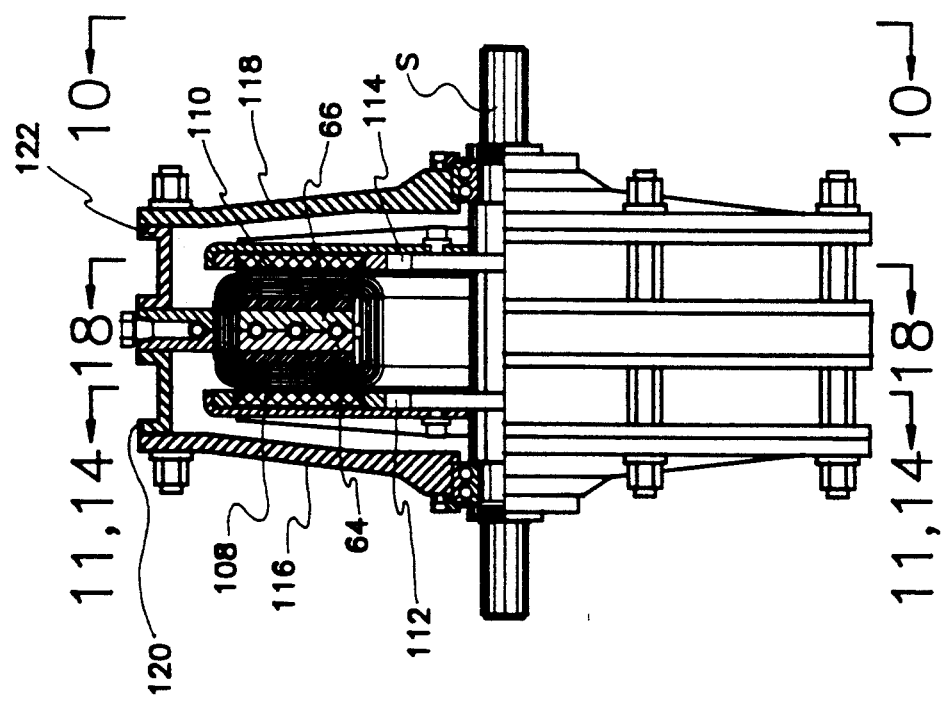
FIG. 9 is a partial cutaway view along the shaft axis of the embodiment shown in FIG. 8.
Figure 19B:
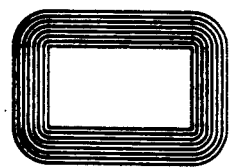
FIG. 19B is a detail, diagrammatic view illustrating an armature coil, taken from the top of FIG. 19A.
Figure 19A:
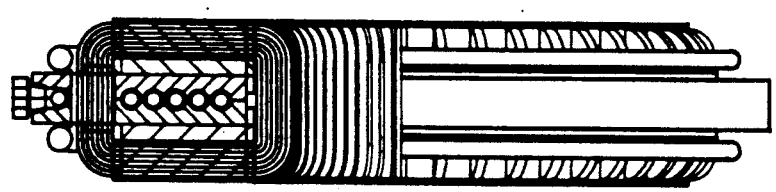
FIG. 19A is a cross sectional view along line 19—19 of FIG. 18 showing the armature coils wound about the central, integral heat sink and both the lamination cores on either side thereof.
Figure 18:
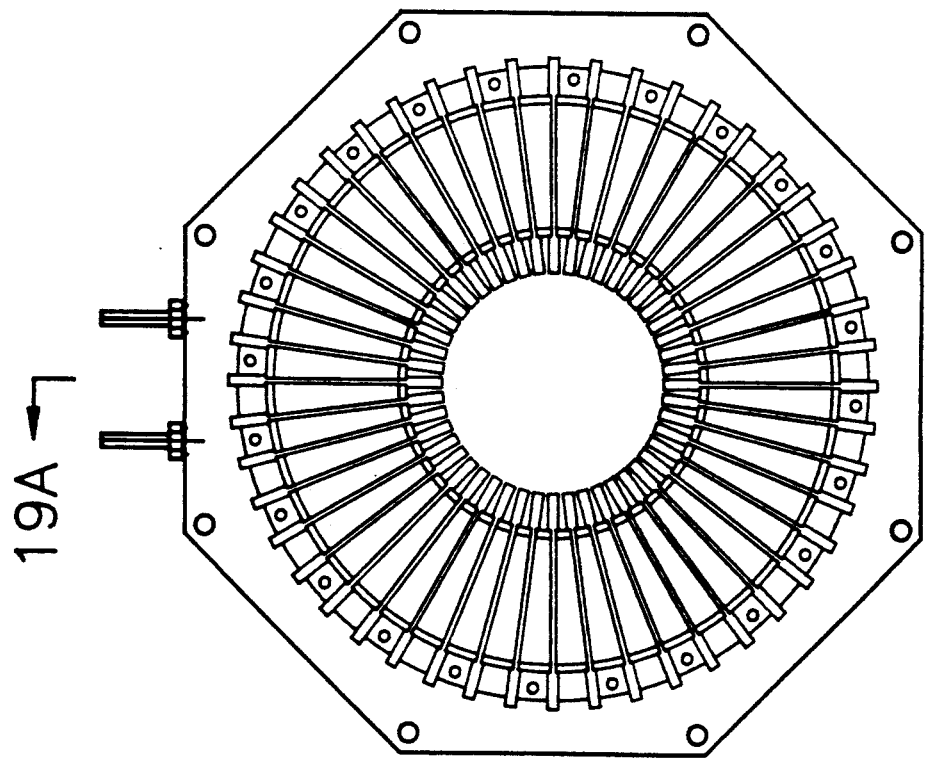
FIG. 18 is a cross sectional view a long line 18—18 of FIG. 9 showing a plan view of the stator assembly including the inlet and outlet ports for the coolant coils.
Figure 22A:
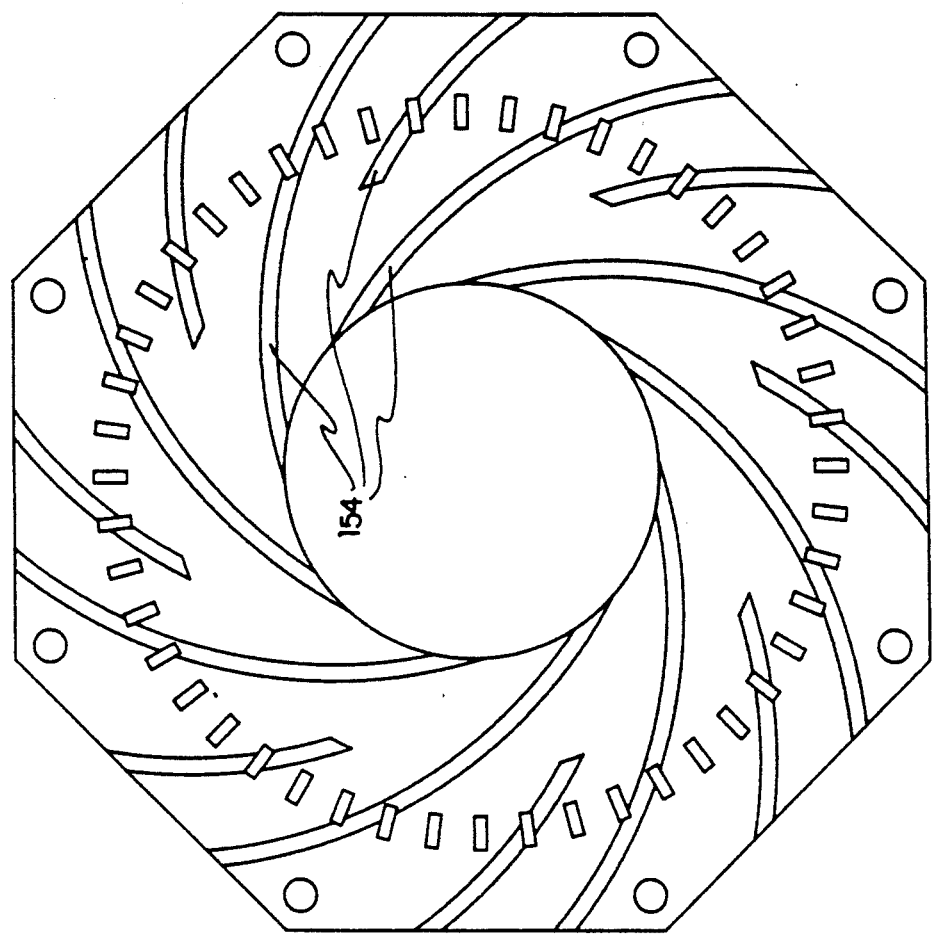
FIG. 22A is a view taken along line 22A—22A in FIG. 22 showing the spiral vanes cut into the pre-cast aluminum heat sink to allow for air cooling of the lamination core or cores and the armature coils wrapped thereabout.
Figure 22:
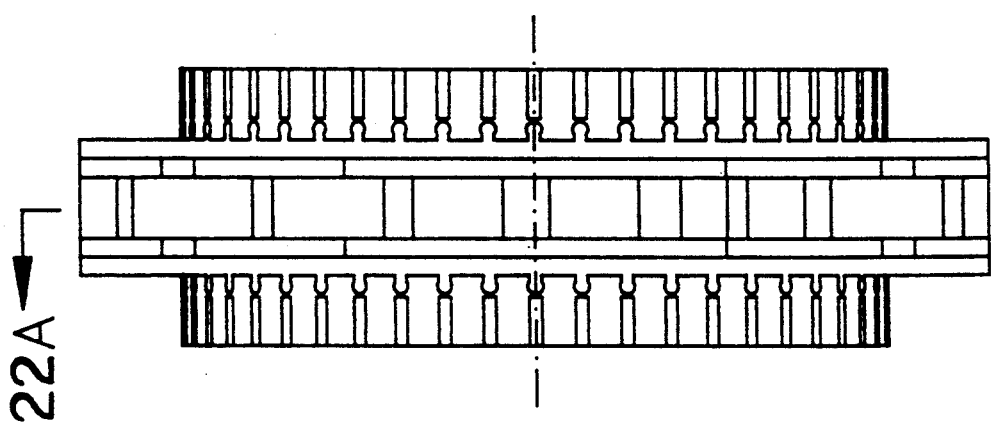
FIG. 22 is a side view of an alternative, air cooled heat sink and core assembly.
Figure 24:
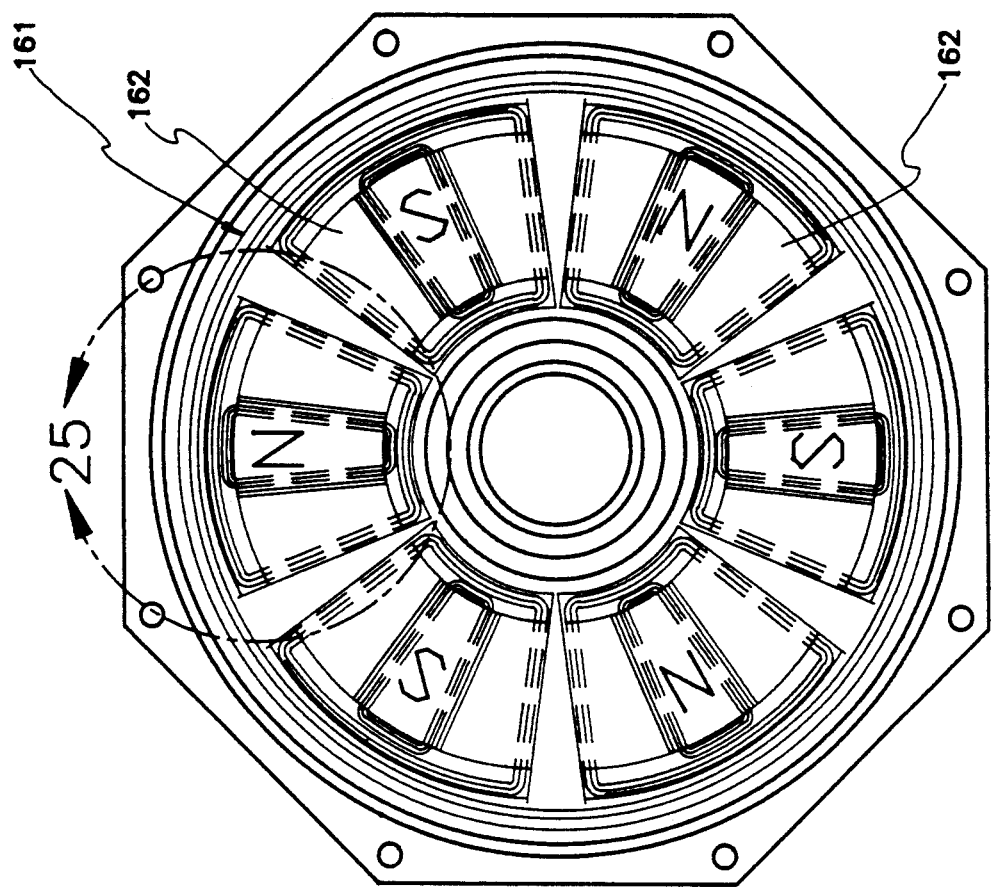
FIG. 24 is a cross sectional view along line 24—24 of FIG. 23 showing a plan view of six of the pre-wound DC field poles with dual windings mounted on a rotor disk.

FIG. 18 is a view along line 18—18 of FIG. 9 showing the armature coils A and FIGS. 19A and 20 are views similar to one another, both taken along line 19A—19A of FIG. 18. Referring to FIG. 20, there is shown the pre-cast lamination core and heat sink assembly with the pre-machined slots within each of the two halves of the heat sink for the insertion of the armature coils A. To minimize the air gap over the conductors, two flat recesses could be machined on each side of each of the slots, and after the armature coils are wound on the stator, steel strips with a high permeability to magnetic flux could be welded in the pre-machined recesses to narrow the gap and then the strips could be ground to a smooth surface. In FIG. 21, taken along line 21—21 of FIG. 20, the internal copper tubing T is shown, this tubing T being laid within pre-cast cooperating spiral grooves on the aluminum heat sink plates 146, 148, shown in FIG. 20. Also seen in FIG. 21 is the inlet port 150 and outlet port 152 attached to the tubing T to allow for the circulation of a cooling fluid through the heat sink. During construction, each of the heat sink plates 146, 148 would be sprayed to fill the grooves with a heat conducting compound and copper tubing is sandwiched between the two cooperating plates which are then bolted together to form the lamination core/heat sink assembly. In FIGS. 22 and 22A an alternative air cooled heat sink is shown. Also made out of pre-cast aluminum, there are spiral vanes 154 formed in each of the cooperating plates to increase the radial shear strength. During construction, both heat sink plates would be sprayed with a non-corrosive thermal conducting compound, the laminated cores are assembled as discussed previously, and the laminated core/heat sink assembly is bolted or otherwise joined together. The armature coils are then wound and placed in the slots, arranged radially outwards from the shaft, as discussed above, through the lamination core or cores. A thin layer of thermal insulation, such as mica, could be laid between the layers of copper conductors to reduce the heat buildup in the armature coils.

The present invention covers a wide variety of discoidal polyphase brushless DC and AC synchronous machines that utilize permanent magnet field poles. However, there are limits to the size of the permanent magnets that can be manufactured and the utilization of permanent magnets over a certain size becomes impractical due to the demagnetization thereof under heavy current load.

FIGS. 23-28 show a large polyphase brush less DC and AC synchronous machine having two separate lamination cores 156, 158 mounted on either side of the integral two piece heat sink 160. Mounted on the rotor(s) 161 are self-excited DC field poles 162 with single or dual windings. The field poles 162 are mounted and riveted to the rotor(s) 161. There is a secondary lamination core 164 integral with the rotor(s) 161. Secondary armature coils 166 are wound around and through the secondary lamination core 164. Facing these, and mounting on the inner annular surface 168 of the stator ring are a plurality of permanent magnets 170. As the secondary core and windings 164, 166 pass over the permanent magnets 170, a current is induced in the coils 166 to excite the field poles 162. An external power source (not shown) connected to the rotors by annular commutator rings (not shown) or a similar arrangement would be used to power the field poles 162 until approximately 30% of operational RPM's are reached. These laminated field poles would be manufactured of M-14 (0.14) thick 5% Silicon steel strips wound tightly on an inner round steel angle with an inward flange. These strips would then be stacked to a depth of 4" to 12" and then an outer steel angle would be press fit to hold the lamination stack tightly between the inner and outer steel angles. In smaller field poles, one winding could be used. In larger field poles, the magnetic flux circulation would be in close enough proximity to the field pole windings to form a blind spot or a low magnetic flux concentration. To equalize the flux circulation, a second set of windings 176' is added in the central area of the pole. In these dual windings, a reverse magnetic field is generated between the primary and secondary windings, and to reduce cross field cancellation, two narrow slots 172 are cut on top of the laminated core in between the primary and secondary windings to equalize the magnetic flux.

Figure 23:
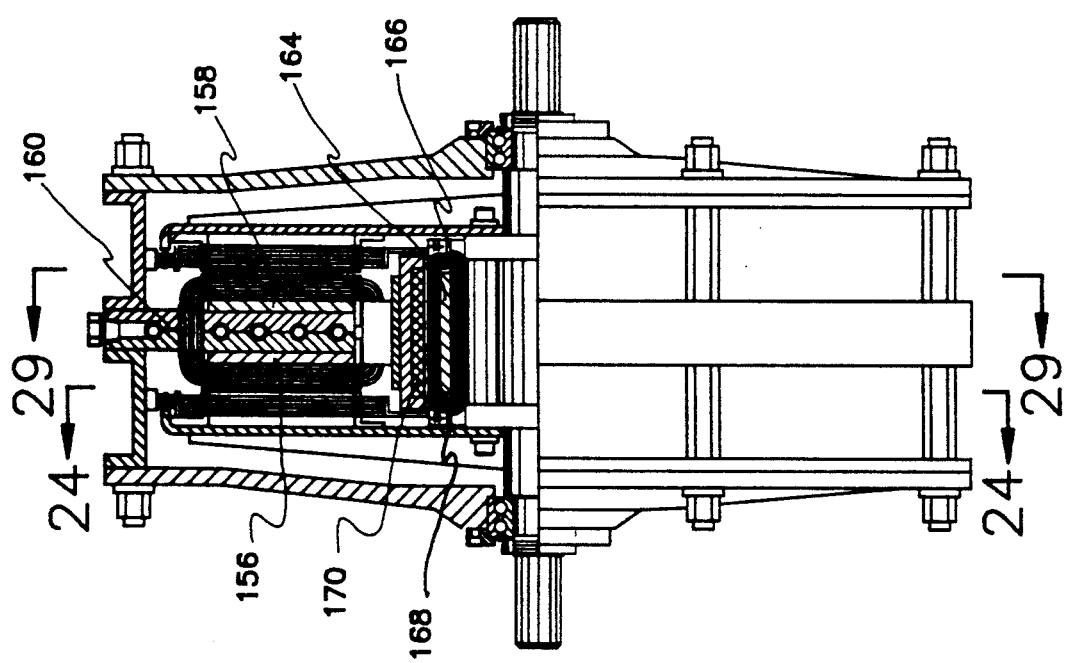
FIG. 23 is a partially cutaway cross sectional view of a fifth embodiment of the invention having pre-wrapped DC field poles mounted on the rotors, the field poles being wrapped to provide for alternating polarity and being excited by a second lamination core and armature windings mounted integral to the rotors and passing, alternator fashion, over a series of magnets mounted annularly on the stator to induce current flow therein.
Figure 30:
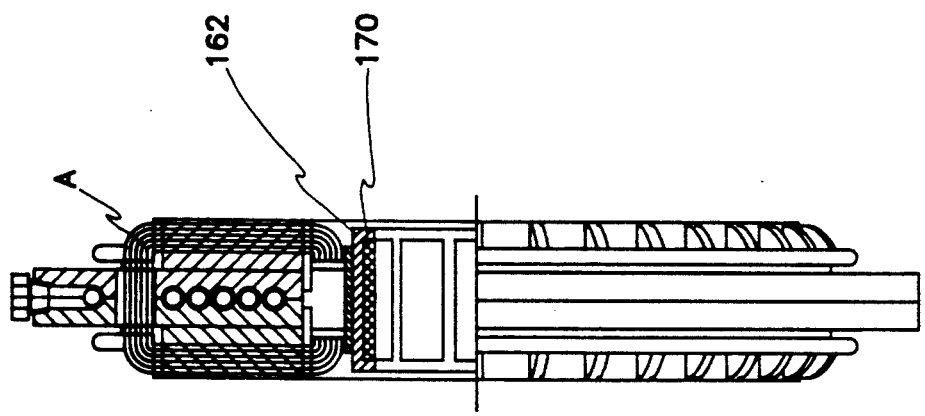
FIG. 30 is a partial cross-sectional view along line 30—30 of FIG. 29 showing another view of the inner stator annulus of permanent magnets.
Figure 29:
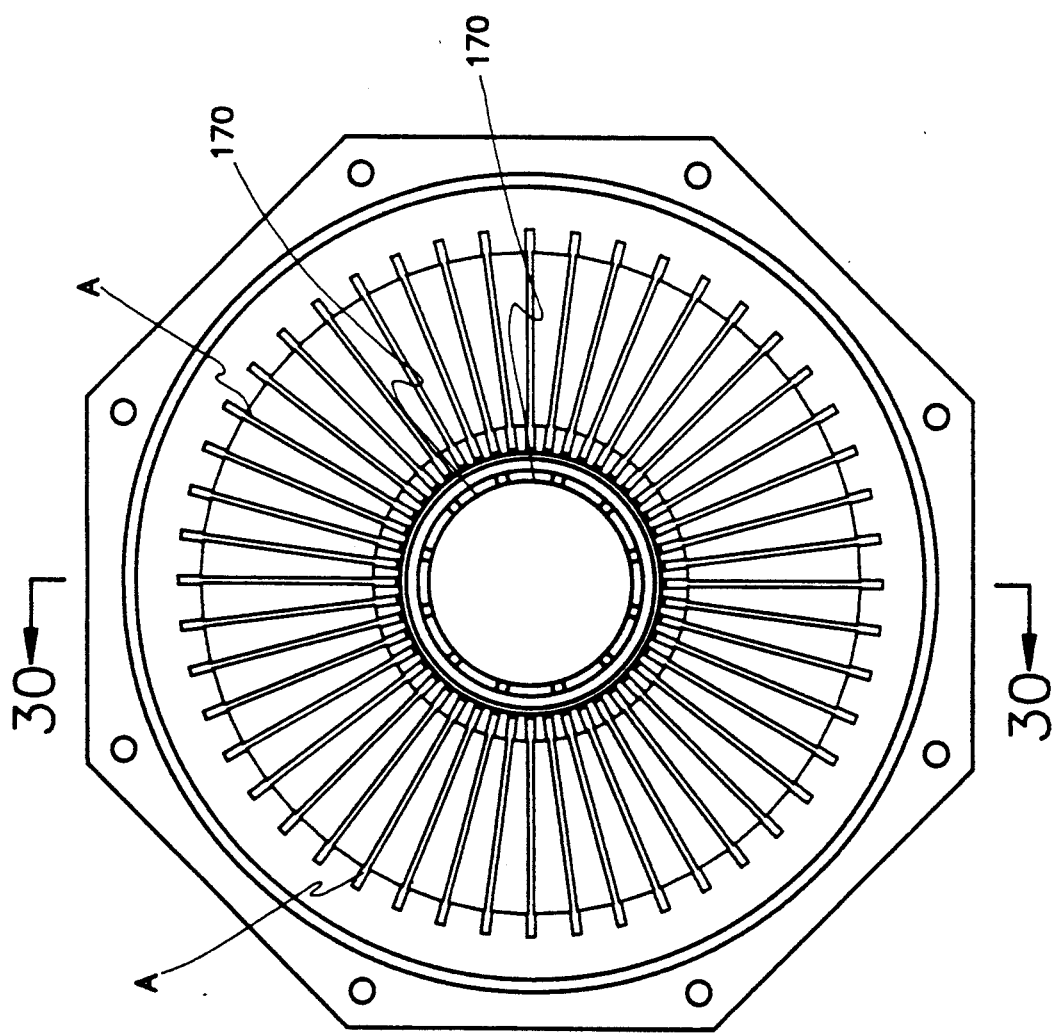
FIG. 29 is a plan view along line 29—29 of FIG. 23 showing the position of the inner annulus of permanent magnets mounted on the stator.

Referring to FIG. 28, a developed view of a simplified schematic diagram showing the secondary armature coils 166 laid over the permanent magnets 170 and connected through solid state rectifiers 174 to the field pole windings 176, which have alternating polarities. FIG. 29 is a view taken along line 29—29 of FIG. 23 showing the armature coils A being radially arranged about the central shaft, as discussed in the previous embodiments.

Turning to FIGS. 31 and 31A there is shown an embodiment that would be best employed for high speed applications. In this embodiment, the rotor body itself is made of a high strength aluminum or composite material with the rare earth permanent magnets mounted within steel channels that have a high permeability to magnetic flux. The thickness of this steel channel is proportional to the size of the rotor and the flux density needed for the return circulation between the north and south poles within the steel channel web. For high speed applications, magnetic frictionless bearings provide axial and radial spacing that is lubrication-free. A close-up of one of these bearings is shown in FIG. 31A. Two annular channels 178, 180 each contain a continuous ring of permanent magnets 182, 184 having opposite polarities that are aligned to face each other at a predetermined distance to maintain the minimal axial air gap between the stator and the rotor.

Figure 34:
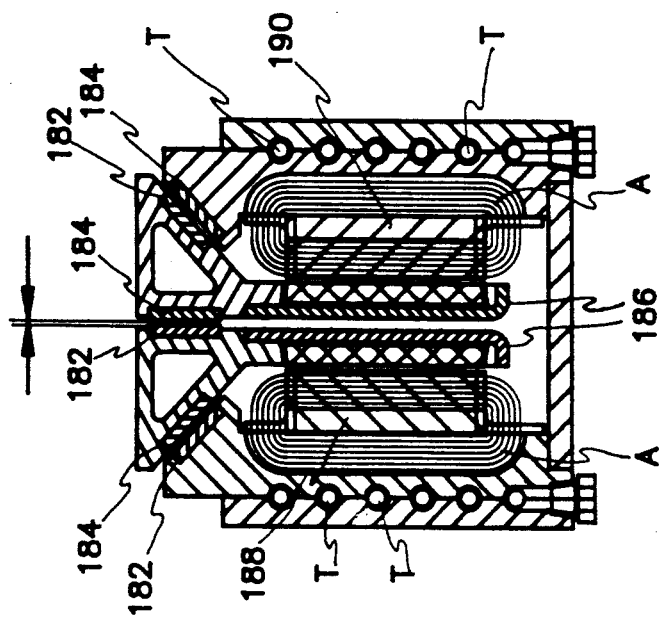
FIG. 34 is a cross sectional view along line 34—24 of FIG. 33 showing further details of the seventh embodiment.
Figure 33:
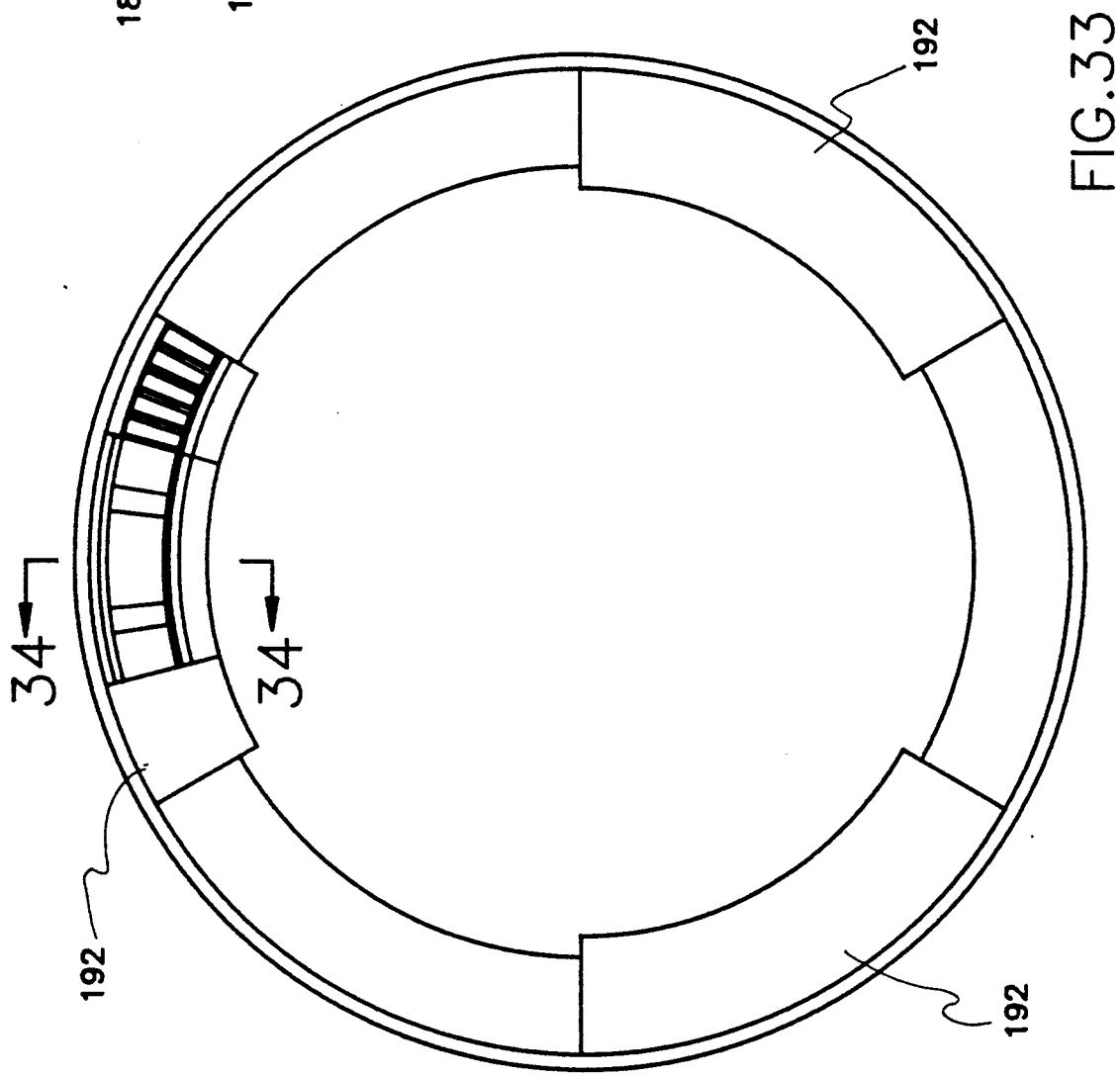
FIG. 33 is a plan view of a seventh embodiment of the invention having a pair of upper and lower lamination cores with each of the cores having armature coils wound therethrough and each having an integral heat sink. Two independent rotors are mounted in between the coils, with frictionless magnetic bearings similar to those discussed in the previous embodiment, that maintain both the minimal axial air gap between the poles on the rotors and the armature coils, and also the distance between the rotors themselves.

Another embodiment that uses the magnetic frictionless bearings is shown in FIGS. 33 and 34. This is a large annular polyphase brushless AC or DC motor or generator using either permanent magnets or the self-excited DC field poles spaced on the rotors as discussed in the previous embodiments above. One or two rotors can be utilized in this type of configuration, with drive takeoffs located either inside or outside the ring. With dual rotors, they could rotate in the same or in opposite directions, depending on the electrical switching and control system. In the view shown in FIG. 34, two independent rotors 186 are confined within the two lamination cores 188, 190. As in the embodiments discussed above, each of the lamination cores are mounted on two piece integral heat sinks having internally mounted cooling tubes T. The rotors are suspended by means of three sets of magnetic frictionless bearings 182, 184. Note that in FIG. 33, there are shown three separate sections of independent stators 192, as compared to the single continuous stators that are shown in the previous embodiments.

We now turn to a discussion of the various switching and control mechanisms.

Figure 35:
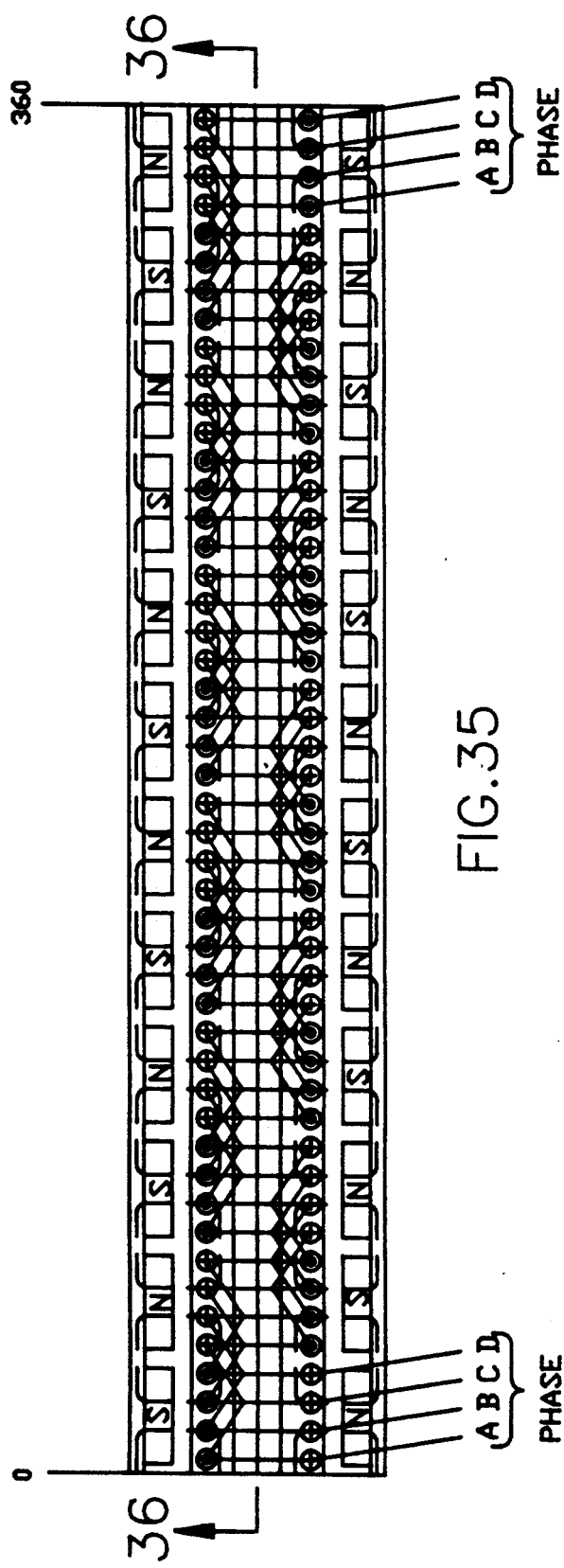
FIG. 35 is a simplified developed view of a dual stator machine wired into four phases that contains 48 armature coils and two single rotors with six poles on each rotor.

FIG. 35 is a simplified developed view about 360 degrees of a dual lamination core stator assembly with two rotor assemblies where the armature coils are divided into four brushless DC phases.

Figure 36:
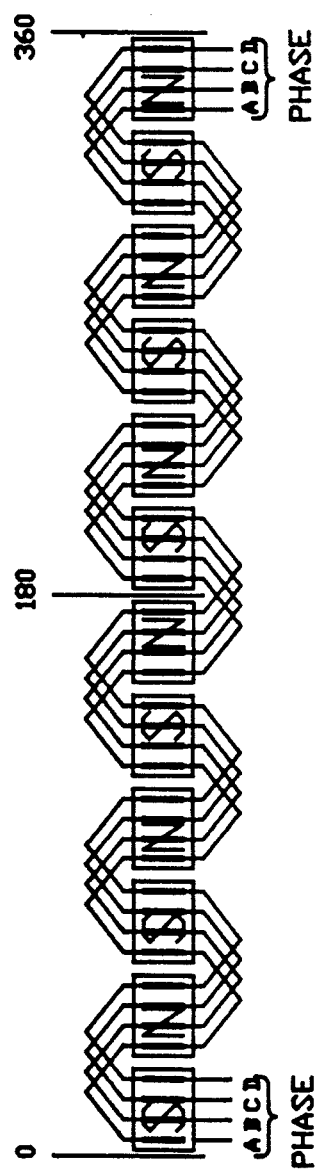
FIG. 36 is a schematic view of the four phases in FIG. 35 distributed over 12 permanent magnet poles.

FIG. 36 is a simplified cross-section taken along line 36—36 of FIG. 35. showing 48 armature coils distributed over 12 permanent magnet field poles.

Figure 37:
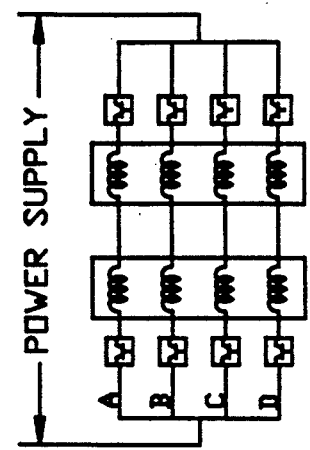
FIG. 37 is a schematic diagram of a four phase stator assembly, with either a dual or single lamination core, connected to a power supply in parallel through solid state switches.

FIG. 37 is a schematic diagram of the four brush less DC phases connected in parallel through power switches to the power supply thus allowing the torque produced by a motor type embodiment of the present invention to be control led in discrete steps by switching the phases "A", "B", "C", or "D" on or off.

Figure 38:
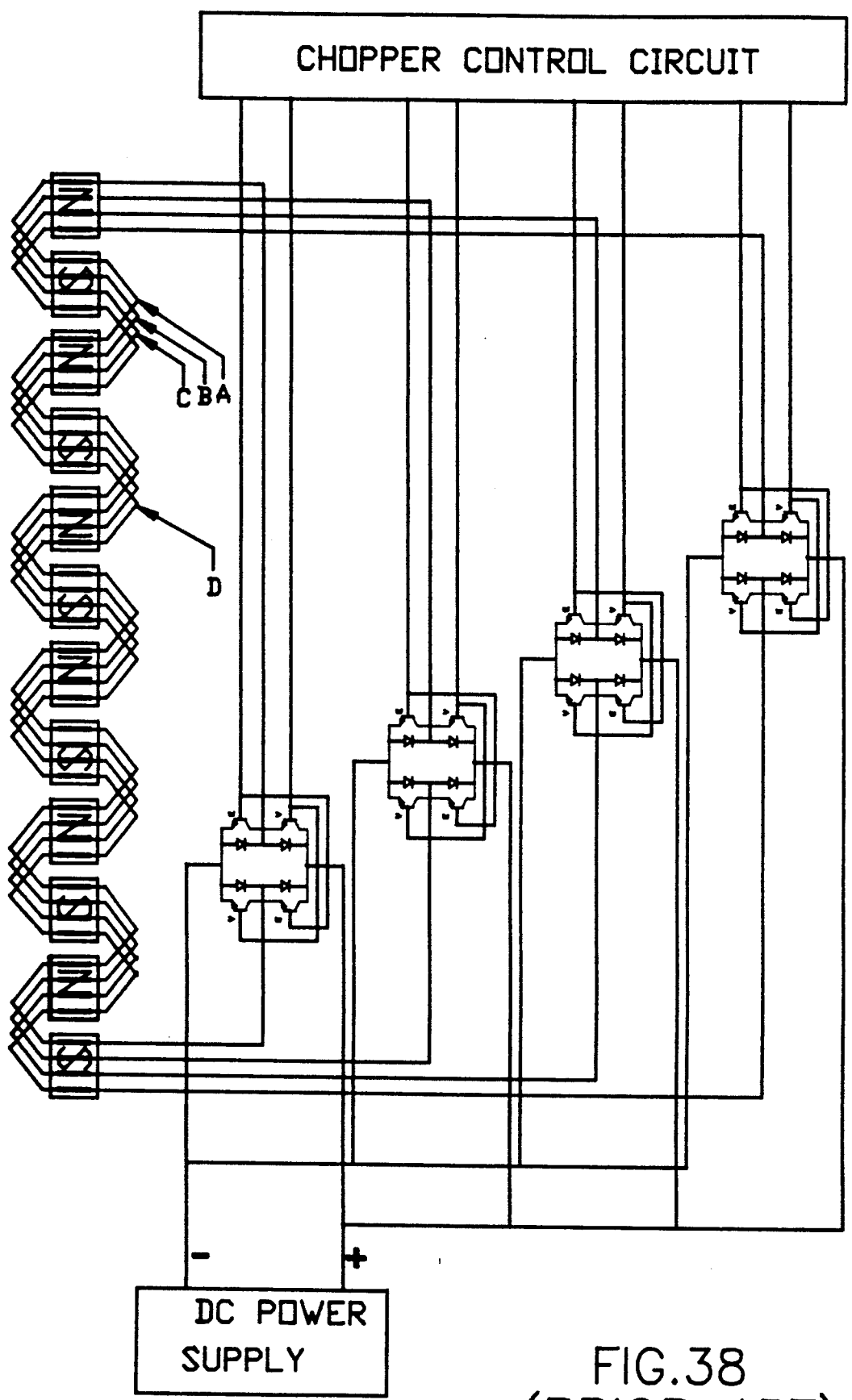
FIG. 38 is a schematic diagram of a conventional bi-directional "H" bridge sequential power switching or "chopper" circuit.

In FIG. 38 there is shown a schematic diagram of a commercially available sequential or "chopper" switching circuit where each phase is connected in parallel to the power supply through a bi-directional "H" current switching bridge.

It is to be understood that the present invention is not limited to the sole embodiments described above, but encompasses any and all embodiments within the scope of the following claims.

I claim:

1. A discoidal brushless DC, AC synchronous and induction motor-generator comprising:

a frame structure including means to support at least one stator;

at least one stator proximate to at least one rotor, said rotor containing a plurality of means to generate a magnetic field, and said rotor being connected to a shaft having a shaft axis, each said stator further comprising;

at least one toroidal lamination core, including a core axis collinear with said shaft axis, said lamination core having a plurality of core slots defining an annular region, wherein the circumferential distance between adjacent core slots defines a slot pitch;

a plurality of armature coils wound across said lamination core and through said core slots wherein;

each said armature coil comprises a wire wound in multiple turns, said turns of wire being insulated from adjacent turns of said wire and from said lamination core;

said wire forming each of said armature coils having two wire ends terminating on the outer surface of said stator and connected to wire ends of other of said armature coils and ultimately to switching and control means;

each of said armature coils being series connected over a predetermined number of slot pitches;

and said frame structure includes means to define a minimal axial air gap between said stator and said rotor; whereby a magnetic flux of alternating polarity in each of said armature coils may be generated by a current flow through said wires of said armature coils; and each of said stators being mounted proximate to a heat sink means for dissipating heat, whereby said heat sink means cools said plurality of armature coils and said toroidal lamination core.

2. A discoidal brushless DC, AC synchronous and induction motor-generator according to claim 1 comprising:

two of said stators sandwiching one of said rotors wherein said plurality of means to generate a magnetic field contained within said rotor are permanent magnets and where said permanent magnets are located on each of the two sides of said rotor.

3. A discoidal brushless DC, AC synchronous and induction motor-generator according to claim 2, wherein said heat sink means is comprised of two aluminum half shells having complementary spiral grooves with copper tubing enclosed therein and attached thereto with a material having a high heat conductivity, said copper tubing further having an inlet port and an outlet port; whereby liquid coolant is impelled through said copper tubing, thereby conducting heat away from said heat sink means.

4. A discoidal brushless DC, AC synchronous and induction motor-generator according to claim 2, wherein said heat sink means is comprised of two aluminum half shells having complementary arcuate slots to allow air flow therethrough; whereby ambient air moves through said arcuate slots, thereby conducting heat away from said heat sink.

5. A discoidal brushless DC, AC synchronous and induction motor-generator according to claim 2, wherein said permanent magnets mounted to said rotor are mounted within a U-shaped channel, said channel being constructed of a material having a high permeability to magnetic flux.

6. A discoidal brushless DC, AC synchronous and induction motor-generator according to claim 1 comprising:

one of said stators, said stator having two of said toroidal lamination cores, both of said lamination cores being proximate said heat sink means, said motor-generator further including two of said rotors, each of said rotors being proximate one of said lamination cores, and said motor-generator further including two shafts, with each of said shafts being attached to one of said rotors.

7. A discoidal brushless DC, AC synchronous and induction motor-generator according to claim 6, wherein said heat sink means is comprised of two aluminum half shells having complementary spiral grooves with copper tubing enclosed therein and attached thereto with a material having a high heat conductivity, said copper tubing further having an inlet port and an outlet port; whereby liquid coolant is impelled through said copper tubing, thereby conducting heat away from said heat sink means.

8. A discoidal brushless DC, AC synchronous and induction motor-generator according to claim 6, wherein said plurality of means to generate a magnetic field are permanent magnets.

9. A discoidal brushless PC, DC synchronous and induction motor-generator according to claim 8, wherein said permanent magnets mounted to each of said rotors are mounted within a U-shaped channel, said channel being constructed of a material having a high permeability to magnetic flux.

10. A discoidal brushless DC, AC synchronous and induction motor-generator according to claim 1, comprising:

four of said toroidal lamination cores, two of said cores being internal and two of said cores being external, said two internal cores being proximate a first heat sink means, said first heat sink means including two aluminum half shells having complementary spiral grooves with copper tubing enclosed therein and attached thereto with a material having a high heat conductivity, said copper tubing further having an inlet port and an outlet port to allow for circulation of a liquid coolant, and where each of two said external cores being proximate second heat sink means, each of said second heat sink means consisting of a material having a high degree of heat conductivity and having therein a series of slots to increase the surface area thereof and thus aid in cooling, and two rotors, each one of said rotors being located between one of said internal cores and one of said external cores, each of said rotors further having two sides, said plurality of means of generate a magnetic field being located on each of said sides.

11. A discoidal brushless DC, AC synchronous and induction motor-generator according to claim 10, wherein said plurality of means to generate a magnetic field are permanent magnets.

12. A discoidal brushless DC, AC synchronous and induction motor-generator according to claim 11, wherein said permanent magnets mounted to each of said rotors are mounted within a U-shaped channel, said channel being constructed of a material having a high permeability to magnetic flux.

13. A discoidal brushless DC, AC synchronous and induction motor-generator comprising:

a frame structure including means to support at least one stator;

a stator proximate to at least one rotor, each of said rotors containing a plurality of means to generate a magnetic field, and said rotor being connected to a shaft having a shaft axis, each said stator further comprising;

a pair of toroidal lamination cores, including a core axis collinear with said shaft axis, each said lamination core having a plurality of core slots, wherein the circumferential distance between adjacent core slots defines a slot pitch;

a plurality of armature coils wound across said lamination core and through said core slots wherein;

each said armature coil comprises a wire wound in multiple turns, said turns of wire being insulated from adjacent turns of said wire and from said lamination core;

said wire forming each of said armature coils having two wire ends terminating on the outer surface of said stator and connected to wire ends of other of said armature coils and ultimately to switching and control means;

each of said armature coils being series connected over a predetermined number of slot pitches;

and said frame structure includes means to define a minimal axial air gap between said stator and said rotor; whereby a magnetic flux of alternating polarity in each of said armature coils may be generated by a current flow through said wires of said armature coils; and said stator being mounted proximate to a heat sink means for dissipating heat, whereby said heat sink means cools said plurality of armature coils and said lamination core.

14. A discoidal brushless DC, AC synchronous and induction motor-generator according to claim 13, wherein said plurality of means to generate a magnetic field are permanent magnets.

15. A discoidal brushless DC, AC synchronous and induction motor-generator according to claim 14, wherein said permanent magnets mounted to each of said rotors are mounted within a U-shaped channel, said channel being constructed of a material having a high permeability to magnetic flux.

16. A discoidal brushless DC, AC synchronous and induction motor-generator according to claim 13, wherein said heat sink means is comprised of two aluminum half shells having complementary spiral grooves with copper tubing enclosed therein and attached thereto with a material having a high heat conductivity, said copper tubing further having an inlet port and an outlet port; whereby liquid coolant is impelled through said copper tubing, thereby conducting heat away from said heat sink means.

17. A discoidal brushless DC, AC synchronous and induction motor-generator comprising:

a frame structure including means to support at least one stator;

at least one stator proximate to at least one rotor, said rotor containing a plurality of conductive rods, and said rotor being connected to a shaft having a shaft axis, each of said conductive rods extending axially outwards from said shaft axis and being contained within an annular U-shaped channel constructed of a material having a high permeability to magnetic flux, said stator further comprising;

at least one toroidal lamination core, including a core axis collinear with said shaft axis, said lamination core having a plurality of core slots, wherein the circumferential distance between adjacent core slots defines a slot pitch;

a plurality of armature coils wound across said lamination core and through said core slots wherein;

each said armature coil comprises a wire wound in multiple turns, said turns of wire being insulated from adjacent turns of said wire and from said lamination core;

said wire forming each of said armature coils having two wire ends terminating on the outer surface of said stator and connected to wire ends of other of said armature coils and ultimately to switching and control means;

each of said armature coils being series connected over a predetermined number of slot pitches;

and said frame structure includes means to define a minimal axial air gap between said stator and said rotor; whereby a magnetic flux of alternating polarity in each of said armature coils may be generated by a current flow through said wires of said armature coils; and said magnetic flux of said armature coils facing said plurality of conductive rods;

each of said stator being mounted proximate to a heat sink means for dissipating heat, whereby said heat sink means cools said plurality of armature coils and said lamination core.

18. A discoidal brushless DC, AC synchronous and induction motor-generator according to claim 17, wherein said heat sink means is comprised of two aluminum half shells having complementary spiral grooves with copper tubing enclosed there in and attached thereto with a material having a high heat conductivity, said copper tubing further having an inlet port and an outlet port; whereby liquid coolant is impelled through said copper tubing, thereby conducting heat away from said heat sink means.

19. A discoidal brushless DC, AC synchronous and induction motor-generating comprising:

a frame structure including means to support at least one stator;

at least one stator including an inner and outer annular surface and having at least one at least one primary toroidal lamination core, including a primary axis collinear with said shaft axis, said lamination core having a plurality of primary core slots, wherein the circumferential distance between adjacent primary core slots defines a slot pitch and said stator further including a plurality of permanent magnets mounted on said inner annular surface of said stator;

at least one rotor including a plurality of wound field pole coils, said wound field poles having a primary winding and a secondary winding wherein said secondary winding is disposed within the confines of said primary winding, and said rotor further including a secondary toroidal lamination core, having a core axis collinear with said shaft axis, having a plurality of secondary core slots, wherein the circumferential distance between adjacent secondary core slots defining a slot pitch with a plurality of secondary armature coils wound through said secondary core slots, wherein each said secondary armature coil comprises a flat copper wire wound in multiple turns, said turns of wire being insulated from adjacent turns of said wire and from said secondary lamination core;

said wire forming each of said secondary armature coils having two wire ends connected to one of said wound field poles;

a plurality of primary armature coils wound across said primary lamination core and through said primary core slots wherein;

each of said primary armature coils comprises a primary wire wound in multiple turns, said turns of primary wire being insulated from adjacent turns of said wire and from said primary lamination core;

said primary wire forming each of said armature coils having two wire ends terminating on the outer surface of said stator and connected to wire ends of other of said armature coils and ultimately to switching and control means;

each of said primary armature coils being series connected over a predetermined number of slot pitches;

said frame structure includes means to define a minimal axial air gap between said stator and said rotor; whereby a magnetic flux of alternating polarity in each of said armature coils may be generated by a current flow through said wires of said armature coils; and said magnetic flux of said armature coils facing an opposing polarity of one of said wound field poles;

each of said stator being mounted proximate to a heat sink means for dissipating heat, whereby said heat sink means cools said plurality of armature coils and said primary lamination core.

20. A discoidal brushless DC, AC synchronous and induction motor-generator according to claim 19 comprising:

two of said stators sandwiching two of said rotors wherein said wound field pole coils contained within said rotors are located on one of the two sides of each said rotor.

21. A discoidal brushless DC, AC synchronous and induction motor-generator according to claim 19, wherein said heat sink means is comprised of two aluminum half shells having complementary spiral grooves with copper tubing enclosed therein and attached thereto with a material having a high heat conductivity, said copper tubing further having an inlet port and an outlet port; whereby liquid coolant is impelled through said copper tubing, thereby conducting heat away from said heat sink means.

22. A discoidal brushless DC, AC synchronous and induction motor-generator according to claim 1, wherein said means to define a minimal axial air gap between said stator and said rotor includes keying means to fix said rotor to said shaft and said stator to said frame structure.

23. A discoidal brushless DC, AC synchronous and induction motor-generator according to claim 1, wherein said means to define a minimal axial air gap includes magnetic frictionless bearings, said magnetic frictionless bearings comprising a first and second set of magnetic annular rings, said first set of rings having a specific polarity and said second set having an opposite polarity, and where a plurality of said rings from said first set are located on said frame structure and a plurality of said rings from said second set are located on said rotors such that the opposing polarities of said first and second sets of said annular rings hold said rotors at a predetermined distance from said stators.

24. A discoidal brushless DC, AC synchronous and induction motor-generator according to claim 1 comprising:

two of said stators sandwiching two of said rotors wherein said plurality of means to generate a magnetic field contained within said rotors are permanent magnets and where said permanent magnets are located on one of the two sides of each said rotor.

25. A discoidal brush less DC, AC synchronous and induction motor-generator according to in claim 1 cascaded end to end along a single shaft so as to multiply the torque produced on said shaft when connected as a motor or to multiply the current generated when connected as a generator.

* * * * *